United States Patent
Li et al.

(10) Patent No.: US 11,728,927 B2
(45) Date of Patent: Aug. 15, 2023

(54) CONSTELLATION SHAPING WITH FIXED-TO-FIXED SHAPING ENCODING

(71) Applicant: Intel Corporation, Santa Clara, CA (US)

(72) Inventors: Qinghua Li, San Ramon, CA (US); Xiaogang Chen, Portland, OR (US); Assaf Gurevitz, Ramat Hasharon (IL); Feng Jiang, Santa Clara, CA (US); Elad Meir, Ramat Gan (IL); Shiomi Vituri, Tel Aviv (IL); Yaron Yoffe, Rishon LeTsiyon (IL)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 17/118,587

(22) Filed: Dec. 10, 2020

(65) Prior Publication Data

US 2021/0099249 A1 Apr. 1, 2021

Related U.S. Application Data

(60) Provisional application No. 63/078,036, filed on Sep. 14, 2020, provisional application No. 62/946,042, filed on Dec. 10, 2019.

(51) Int. Cl.
  *H04L 1/00* (2006.01)
  *H04W 72/04* (2023.01)
  *H04L 5/00* (2006.01)

(52) U.S. Cl.
  CPC .......... *H04L 1/0042* (2013.01); *H04L 1/0008* (2013.01); *H04L 5/0044* (2013.01); *H04W 72/04* (2013.01)

(58) Field of Classification Search
  None
  See application file for complete search history.

(56) References Cited

U.S. PATENT DOCUMENTS

| | | | | |
|---|---|---|---|---|
| 2010/0246661 | A1* | 9/2010 | Ungerboeck | H04L 27/3405 375/240 |
| 2019/0363738 | A1* | 11/2019 | Strobel | H04L 1/0041 |
| 2020/0313692 | A1* | 10/2020 | Berg | H03M 7/6041 |
| 2022/0014300 | A1* | 1/2022 | Torbatian | H04J 14/0212 |

* cited by examiner

Primary Examiner — Diane L Lo
(74) Attorney, Agent, or Firm — Eversheds Sutherland (US) LLP

(57) ABSTRACT

This disclosure describes systems, methods, and devices related to fixed-to-fixed shaping encoding. A device may determine a mapping table associated with uniformly distributed bits into amplitudes with desired probabilities. The device may predict a number of output bits for an input block. The device may apply padding as needed based on the predicted number of output bits.

20 Claims, 21 Drawing Sheets

CONSTELLATION SHAPING WITH FIXED-TO-FIXED SHAPING ENCODING

CROSS-REFERENCE TO RELATED APPLICATIONS

This application is related to and claims priority to U.S. Provisional Patent Application No. 63/078,036, filed Sep. 14, 2020, and to U.S. Provisional Patent Application No. 62/946,042, filed Dec. 10, 2019, which are hereby incorporated herein by reference in their entirety.

TECHNICAL FIELD

This disclosure generally relates to systems and methods for wireless communications and, more particularly, to constellation shaping with fixed-to-fixed shaping encoding.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 6 illustrates a flow diagram for avoiding error propagation using PHY delimiters in accordance with one or more example embodiments of the present disclosure.

Figure 1:
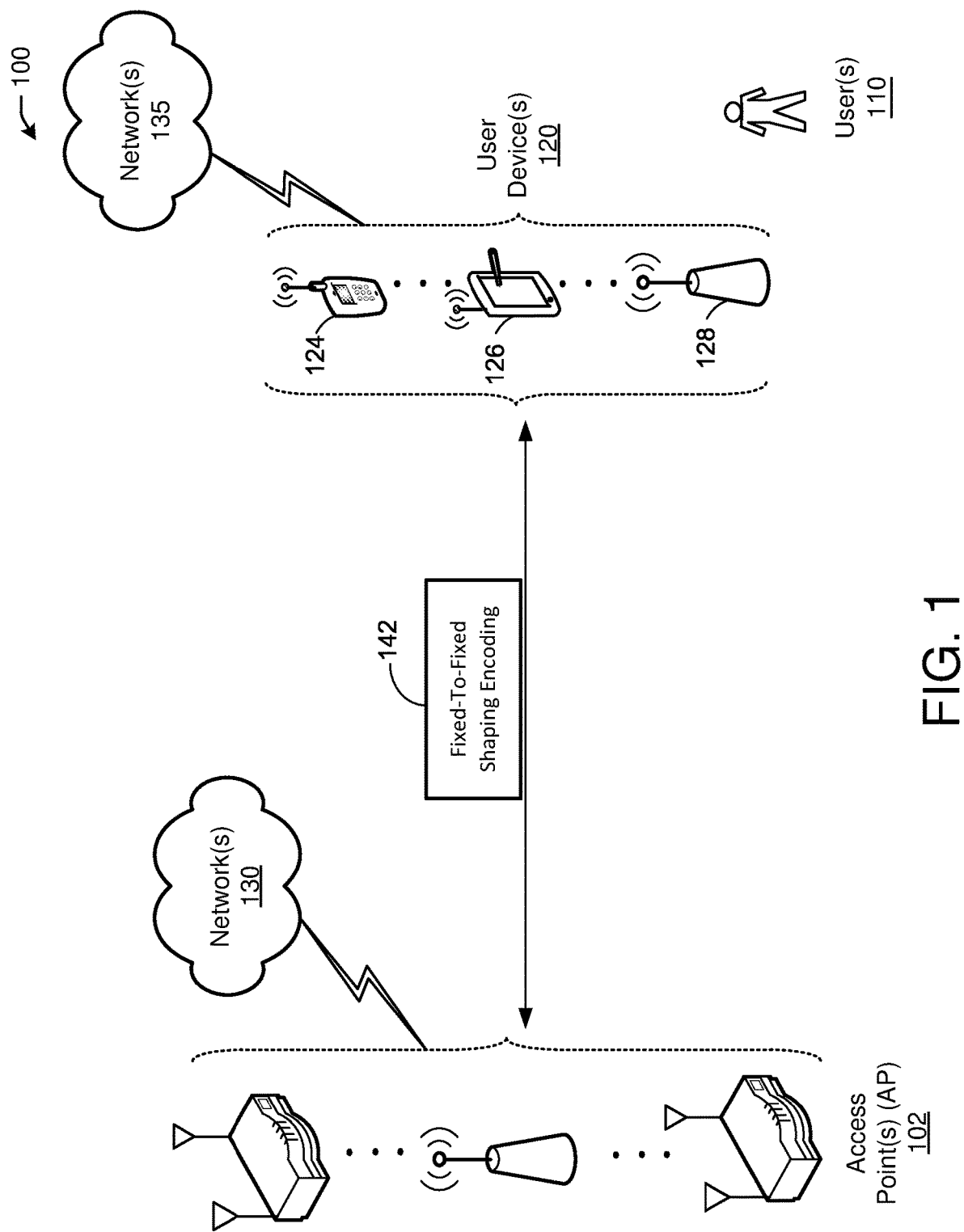
FIG. 1 is a network diagram illustrating an example network environment of fixed-to-fixed shaping encoding, according to some example embodiments of the present disclosure.

It is understood that the above descriptions are for purposes of illustration and are not meant to be limiting.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Recently, a new constellation shaping technique was proposed to improve the efficiency and throughput of wireless communication systems. The proposed method modifies the probabilities of the constellation points, making it more similar to Gaussian distribution. Thus, a shaping gain of up to 1.53 dB can be achieved.

The main block of the constellation shaping method is the shaping encoder, which transforms uniformly distributed bits sequences into amplitudes with desired probabilities.

Another recent proposed solution featured shaping encoding based on a fixed-to-variable (FTV) code, in which the code rate was not fixed and depends on the input realization. The main issue with such strategy is that byte misalignment can occur in the presence of PHY errors, i.e., errors in bits due to channel noise may change the length of the received frame. This may lead to error propagation between media access control protocol data units (MPDUs), and severe loss in performance.

Constellation shaping is achieved by many-to-one mapping and bits puncturing. The loss of information is partially compensated by iterative decoding and strong code, which may be complex in terms of implementation. In addition, not all puncturing methods can be compensated with iterative decoding.

Additional methods that are worth noting are the Shell mapping and Trellis shaping. In both methods, the basic principle is to identify sequences that has total low energy. However, these method may also be complicated to implement at the transmitter, since they require complex encoders, which in many transmitter systems, are based on Viterbi.

It was previously suggested to have a fixed-to-variable distribution matching approach which transforms uniformly distributed bits sequences into shaped bits sequences with different length. Later, a fixed-to-fixed approach combined with probabilistic amplitude shaping (PAS) was demonstrated. This involved a rather complex encoder and decoder that may be difficult to implement in hardware.

One major issue with such approach is the effect of PHY errors. In each communication system, there is some probability that an error will occur during transmission due to channel noise or interference. In systems that may not apply probabilistic shaping, the error is reflected only by wrong decoding, where the value of bits is changed.

In the suggested approach, however, PHY errors may cause a severe problem where the number of bits will be changed. Consequently, byte alignment is compromised, and the receiver may not detect the MAC delimiters. In such a case, a single error may cause errors in the entire aggregate MAC Protocol Data Unit (A-MPDU).

In one or more embodiments, a fixed-to-fixed (FTF) shaping encoding system may present and demonstrate a simple method that transforms the shaping encoding into fixed-to-fixed code.

One or more embodiments may alleviate PHY errors by transforming the fixed-to-variable (FTV) code into FTF by predicting the number of output bits for the input block and taking a small number of overhead bits. The overhead bits are padding bits. There are two types of padding. The padding can be in the payload bits or shaped bits. The purpose of the padding is to fill up the N-bit shaped bit block.

The FTF shaping encoding system may determine that the actual number of output bits is smaller than the predicted output bits and add padding bits. In the case that the actual number of output bits exceeds the expected, the FTF shaping encoding system may not transmit the last bits of the input block. This is reflected in errors (overflow); however, its probability can be arbitrarily low assuming sufficient overhead is applied.

In one or more embodiments, the FTF shaping encoding system may receive a payload having a fixed length, and divide the payload into a plurality of K bit blocks. Each of the K bit blocks may include different numbers of bits per each block. For example, a single block K may include 1 KB of payload information, 2 KB, 4 KB, or 8 KB.

In one or more embodiments, the FTF shaping system may then determine a number of overhead bits based on requirements for low overflow. This step may also determine a number of output bits N in each respective K bit block. For example, in one aspect, the FTF shaping system may determine possible block lengths and overhead bits that may be used such that the probability of overflow for each K bit block is minimized while padding each K bit block with an optimized small number of overhead bits. This step may minimize throughput loss. For example, K may be used to determine N. If a smaller overflow rate is desired, then a larger N is chosen. For a given overflow rate, the mapping from K to N is deterministic, i.e., 1 to 1.

To do this, the system may determine a deviation rate due to framing for different payload lengths based on a ratio of K bits and overhead bits, where the deviation rate decreases with the overhead percentage. The FTF shaping encoding system may transform uniformly distributed bits into amplitudes with desired probabilities of data loss, represented by Gray coding. In one aspect, the FTV code may be based on a predetermined prefix code. Accordingly, the FTF shaping encoding system may represent each amplitude by a unique prefix code, and map the input sequence according to a predefined mapping table. The system may determine the amplitude's probability for overflow based on observed overflow for respective sequences. The probability to receive a specific sequence decays by a factor of 0.5 with each bit added (assuming uniformly distributed input sequence). Thus, dyadic probabilities are achieved.

In one or more embodiments, based on the determined number of overhead bits per respective K bit blocks, the FTF shaping system may generate a PPDU comprising the plurality of K bit blocks that have been reshaped to include the optimized groups overhead bits. In one aspect, responsive to determining the realization for a particular K bit block would lead to fewer bits, padding bits are added.

According to one or more embodiments, responsive to determining that a particular K bit block would lead to more bits (e.g., an overflow situation), only N bits are transmitted for each the respective K bit block. Namely, when overflow occurs for the respective K bit block, the number of transmitted bits remains the same, such that the N bits and some of the payload bits within the K bit block are not transmitted.

According to one or more embodiments, the FTF system may frame the remaining bits after grouping the first payload bits into the K bit blocks. The system may use one or multiple blocks whose payload size(s) are smaller than K bits, and whose overhead bit percentage(s) are the same as or larger than the previous K-bit block. For example, the FTF shaping system may let the number of remaining payload bits to be less than K bits, where one smaller block may be enough to carry the remaining payload bits.

According to one or more embodiments, the FTF system may frame the K bit blocks such that the number of remaining payload bits for each block are not less than K bits and less than 2K bits, and use two smaller blocks to carry the remaining payload bits. In one aspect, the remaining payload bits (padding bits) may include one or more random bits. Accordingly, the decoder may simply discard or ignore the padding bits, and random values may be used for the padding.

According to another aspect, the padding comprises a repetition of a portion of the K bit block. This may serve as a redundancy for recovering data lost in a respective K bit block.

In an alternative embodiment, different length inputs may be reshaped to a fixed length outputs such that PHY errors are minimized. The constellation shaping (CS) scheme is based on a shaping encoder, which transforms the input sequence into a desired non-equiprobable sequence. The shaping encoder is a variable-to-fixed mapping, where inputs with different lengths can be mapped into a constant-length output. At the receiver, inverse operation, i.e. shaping decoding, is applied to obtain the original information sequence. The shaping decoder is a fixed-to-variable mapping, in which the output length varies for the inputs with a fixed-length.

One consequence of applying shaping encoding and decoding is that the transmission is highly susceptible to error propagation. Due to the fixed-to-variable decoding, one error in the physical layer (PHY) can cause two types of errors. First, it may flip the information bits as usual. Second, it can change the output length by inserting error bits or removing information bits. As a result, PHY bit errors lead to bit additions or erasures in the output sequence. Since the output lengths are not fixed, separation between different MPDUs becomes a challenge, and one error in a single packet (or MPDU) may be destructive for the entire aggregated media access control protocol data unit (A-MPDU). For example, the search complexity of MAC MPDU delimiter may increase by 32 times since the original MAC MPDU delimiters are the boundaries of every 4 bytes not every bit. Because the decoding error does not necessarily change the length by multiples of 4 bytes, the receiver either needs to search for the MAC MPDU delimiter assuming every bit can be the starting bit of the delimiter or suffers from the error propagation. In other words, the loss of the byte boundary synchronization between PHY and MAC makes the error propagation. What is worse, since PHY scrambles the payload bits including the MPDU delimiters before shaping/channel encoding, the receiver requires synchronizing the unscrambling sequence with the output of the shaping/channel decoder. If the unscrambling sequence is not aligned with the shaping decoder output, error propagation occurs at the unscrambled bits. Therefore, it is desirable to synchronize the unscrambling sequence with the shaping decoder output first.

Example embodiments of the present disclosure relate to systems, methods, and devices for solutions to error propagation in constellation shaping.

In one embodiment, an error propagation in constellation shaping system may facilitate a technique that enables the separation between MAC protocol data units (MPDUs) in carrier sense (CS) scheme even in the cases of physical layer (PHY) errors.

In one embodiment, an error propagation in constellation shaping system may suggest adding PHY delimiter sequences that symbolizes the end of each segment. Thus, errors are limited to single segments and does not propagate to the neighboring ones.

In one embodiment, an error propagation in constellation shaping system may define a search procedure that locates the delimiters with low complexities even if they are shifted due to errors.

The advantage of this method is that it precludes error propagation. As the MPDUs are separated, errors are confined within the individual MPDUs in which they occur. Consequently, re-transmission is required only for the MPDUs that contain errors, and not for the entire A-MPDU Other solutions involved a complex encoder, and was integrated with convolutional code. In one or more embodiments, a fixed-to-fixed shaping encoding system may facilitate a focus on low density parity check (LDPC) codes.

Example embodiments of the present disclosure relate to systems, methods, and devices for constellation shaping with fixed-to-fixed shaping encoding. One or more embodiments describe a practical way to transform the shaping encoding from FTV into FTF.

According to one or more embodiments, the constellation shaping may include framing procedures for FTF coding.

In one or more embodiments, a fixed-to-fixed shaping encoding system may reduce the requirements of the RF and enhance the support of 4 KQAM transmission.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of fixed-to-fixed shaping encoding, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 15:
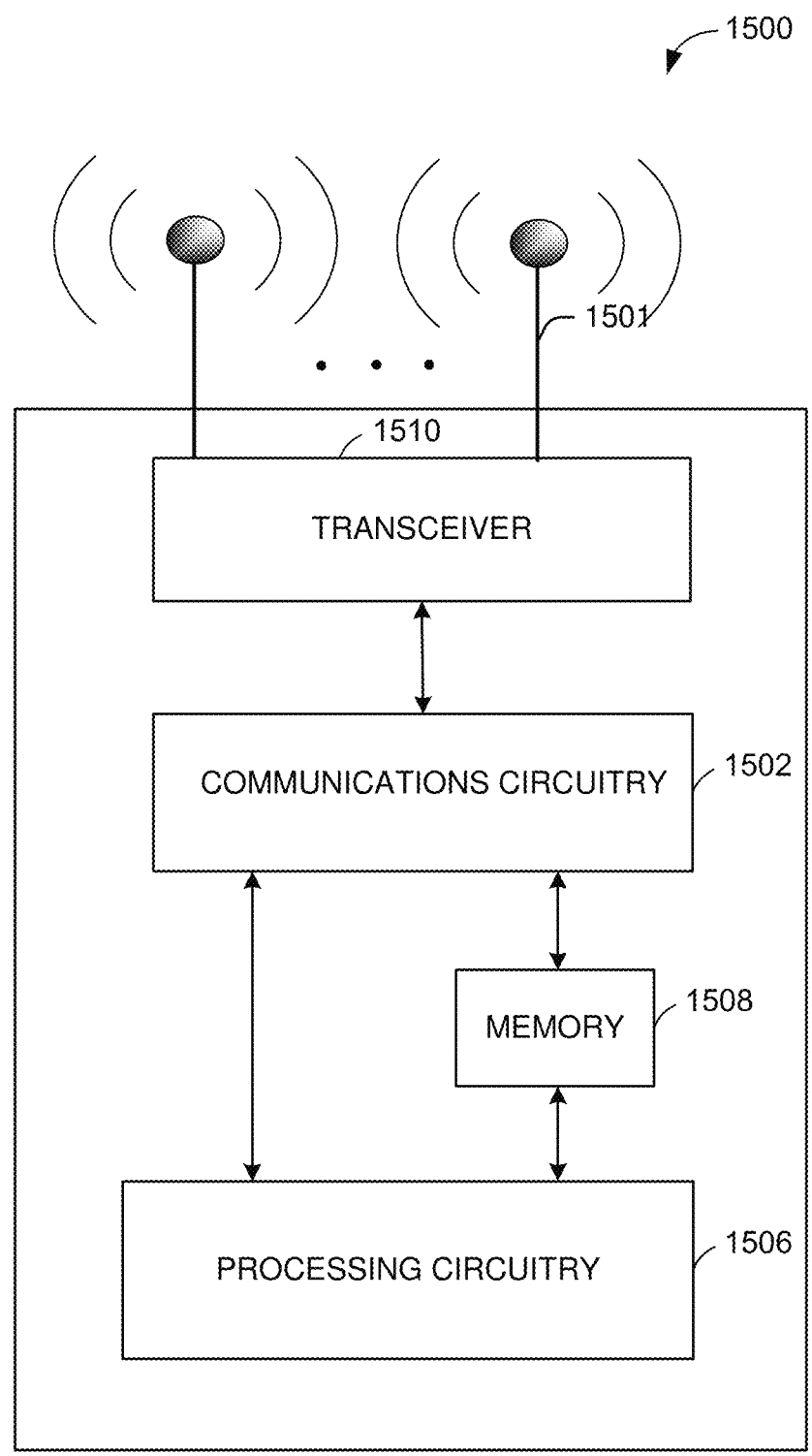
FIG. 15 illustrates a functional diagram of an exemplary communication station that may be suitable for use as a user device, in accordance with one or more example embodiments of the present disclosure.
Figure 16:
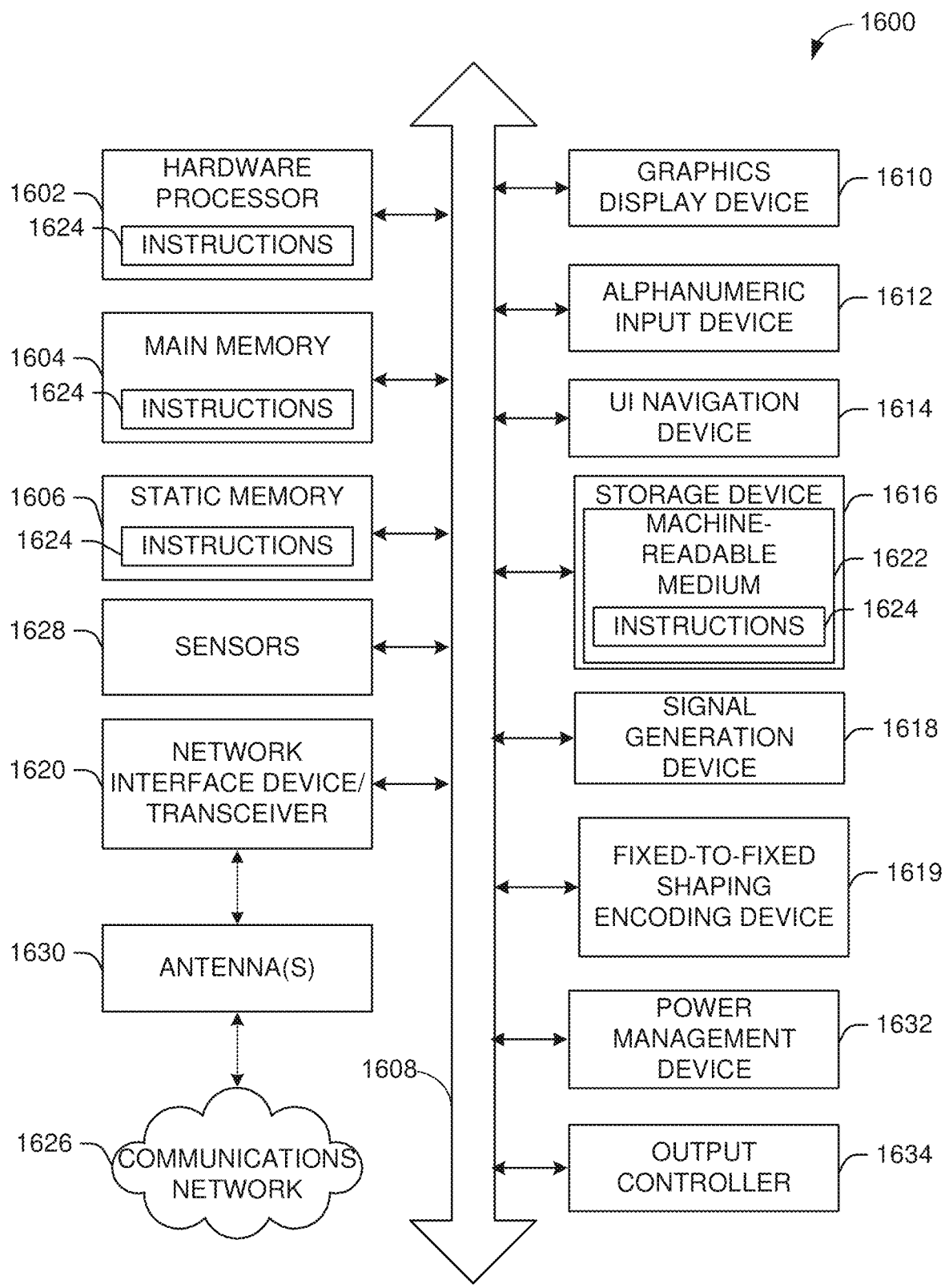
FIG. 16 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 15 and/or the example machine/system of FIG. 16.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate fixed-to-fixed shaping encoding 142 with one or more user devices 120.

It is understood that the above descriptions are for purposes of illustration and are not meant to be limiting.

Shaping encoders transform uniformly distributed bits into amplitudes with desired probabilities, represented by Gray coding. In the previous proposals, FTV code was suggested based on prefix code. The basic idea is to represent each amplitude by a unique prefix code and map the input sequence according to a predefined mapping table. The number of bits, which are represented by each amplitude, determines the amplitude's probability. The probability to receive a specific sequence decays by a factor of 0.5 with each bit added (assuming uniformly distributed input sequence). Thus, dyadic probabilities are achieved. An example prefix-based mapping table is shown in Table 1.

TABLE 1

Prefix Based Mapping Table

| Input Bits | Amplitude (M pam) | Prob. Of Sequence ($P_r$) |
|---|---|---|
| 0 | 1 | 1/2 |
| 10 | 3 | 1/4 |
| 110 | 5 | 1/8 |
| 1110 | ... | ... |
| ... | M-1 | ... |

The average rate of such code can be calculated as follows:

$$\text{Entropy} = \sum_{i=0}^{M-1} -p_r(x_i)\log_2(p_r(x_i)) \left[\frac{\text{bits}}{\text{amplitude}}\right] \quad (1)$$

$$R_{shaping} = \left|\frac{B_{in}}{B_{out}}\right| = \frac{\text{Entropy}}{\log_2(M)-1}$$

Equation 1 illustrates the average rate $R_{shaping}$, where M represents a number of potential amplitudes.

However, when observing finite length sequences, the exact number of output bits is different for each input bit sequence. Hence, it is classified as fixed-to-variable code.

At the receiver, inverse mapping table is applied, and the original information bits are recovered. However, one major issue with such approach is the effect of PHY errors. In each communication system, there is some probability that an error will occur during transmission due to channel noise or interference. In systems that does not apply probabilistic shaping, the error is reflected only by wrong decoding, where the value of bits is changed. In the suggested approach, however, PHY errors may cause a severe problem where the number of bits will be changed. Consequently, byte alignment is compromised, and the receiver may not detect the MAC delimiters. In such a case, a single error may cause errors in the entire A-MPDU.

Figure 2:
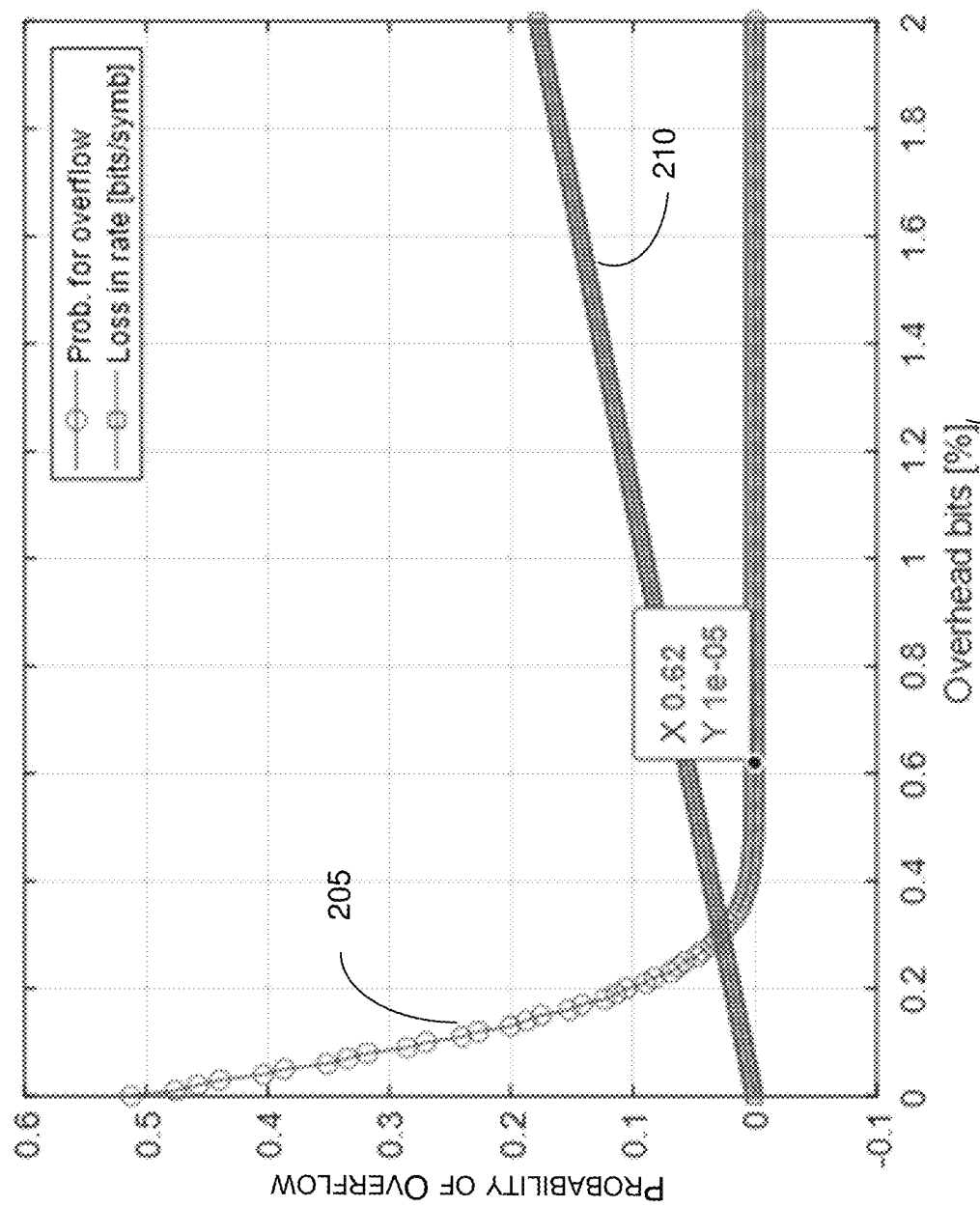
FIG. 2 illustrates probability of overflows vs. overhead bits, in accordance with one or more example embodiments of the present disclosure.

FIG. 2 is a graph illustrating a probability of overflows vs. overhead bits, in accordance with one or more example embodiments of the present disclosure. The overhead bits are padding bits. There are two types of padding. The padding can be in the payload bits or shaped bits. The purpose of the padding is to fill up the N-bit shaped bit block.

To alleviate this issue, it may be proposed to transform the FTV code into FTF by predicting the number of output bits for the input block and taking a small number of overhead bits. In the case that the actual number of output bits is smaller than the predicted, padding bits are added. In the case that the actual number of output bits exceeds the expected, the last bits of the input block may not be transmitted. This is reflected in errors (overflow); however, its probability can be arbitrarily low assuming sufficient overhead is applied.

In FIG. 2, values for probability of overflow 205 are shown, where input block length is 8K bytes and the shaping encoder table is for MCS-13. FIG. 2 also depicts loss of rate values 210, which may be associated with the overhead values. Using a relatively small amount of overhead of (e.g., ~0.6%), it is illustrated that the FTF shaping encoding system 142 (of FIG. 1) would achieve a negligible probability of overflow of 1×10⁻⁵. The system 145 may alleviate PHY errors by transforming the fixed-to-variable (FTV) code into FTF by predicting the number of output bits for the input block and taking a small number of overhead bits. The FTF shaping encoding system may determine that the actual number of output bits is smaller than the predicted output bits and add padding bits. In the case that the actual number of output bits exceeds the expected, the FTF shaping encoding system may not transmit the last bits of the input block. This is reflected in errors (overflow); however, its probability can be arbitrarily low assuming sufficient overhead is applied.

The graph depicted in FIG. 2 illustrates probabilities of overflows for output bits given a certain percentage of overhead bits. When an output is decoded, the length of the output may be different lengths using conventional systems. When an output is made to be a consistent length, there may be a probability that the output is longer and may cause a data overflow, which may cause a transmission to stop.

FIG. 2 illustrates that when the percentage of overhead bits 215 increases, the probability for overflow 205 approaches 0. For example, with 0% overflow, there is a 50% probability of overflow. If the packet error rate is only 0.3, for example, the probability of error becomes less impactful (e.g., less than 10% packet error rate).

According to one or more embodiments, the FTF shaping encoding system 142 may divide the payload into blocks of K bits. For every N block, the FTF shaping encoding system 142 may pad the bits. The receiver will decode the output N bits, and send those bits to the lookup table to decode the (e.g., as shown in Table 1). Each of the decoded input bits are decoded into output amplitudes, which may be decoded to output by a station device.

Figure 3A:
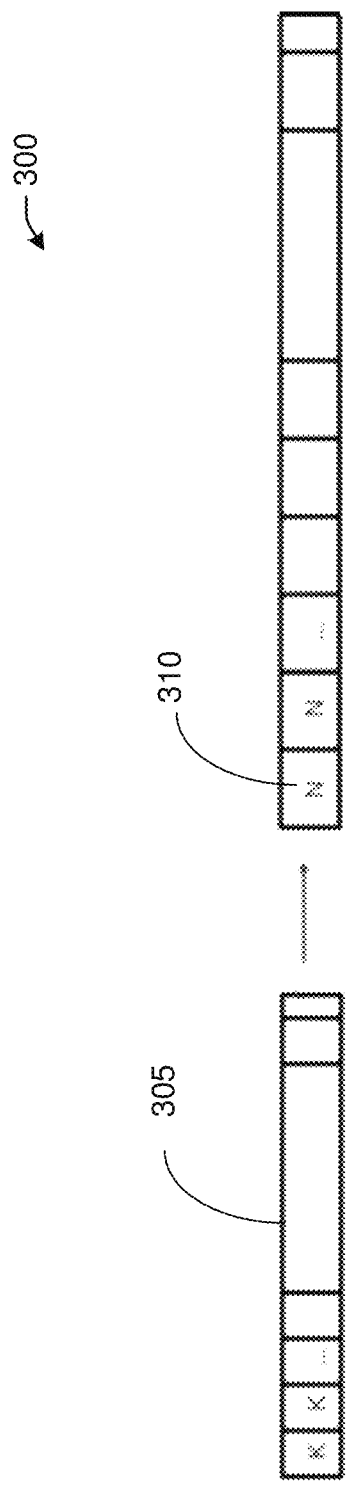
FIG. 3A depicts encoder rates for different payload lengths in accordance with one or more example embodiments of the present disclosure.

FIG. 3A depicts encoder rates for different payload lengths in accordance with one or more example embodiments of the present disclosure. In one or more embodiments, the FTF shaping encoding system 142 may receive a payload 300 having a fixed length, and divide the payload into a plurality of K bit blocks 305. Each of the K bit blocks 305 may include different numbers of bits per each block. For example, a single block K may include 1 KB of payload information, 2 KB, 4 KB, or 8 KB.

In one or more embodiments, the FTF shaping system 142 may then determine a number of overhead bits to add to each respective K bit block 305. The FTF shaping encoding system 142 may select a number of overhead bits based on requirements for low overflow.

According to an embodiment, this step may also determine a number of output bits N 310 in each respective K bit block 305. For example, in one aspect, the FTF shaping system 142 may determine possible block lengths and overhead bits that may be used such that the probability of overflow for each K bit block is minimized (e.g., using the probabilities described with respect to FIG. 2) while padding each K bit block with an optimized number of overhead bits. This step may minimize throughput loss.

To do this, the FTF shaping encoding system 142 may determine a deviation rate due to framing for different payload lengths based on a ratio of K bits and overhead bits, where the deviation rate decreases with the overhead percentage. The FTF shaping encoding system may transform uniformly distributed bits into amplitudes with desired probabilities of data loss, represented by Gray coding. In one aspect, the FTV code may be based on a predetermined prefix code. Accordingly, the FTF shaping encoding system may represent each amplitude by a unique prefix code, and map the input sequence according to a predefined mapping table.

According to one or more embodiments, the FTF shaping encoding system 142 may determine the amplitude's probability for overflow based on observed overflow for respective sequences. The probability to receive a specific sequence decays by a factor of 0.5 with each bit added (assuming uniformly distributed input sequence). Thus, dyadic probabilities are achieved.

In one or more embodiments, based on the determined number of overhead bits per respective K bit blocks, the FTF shaping system 142 may generate a PPDU comprising the plurality of K bit blocks that have been reshaped to include the optimized groups overhead bits. In one aspect, responsive to determining the realization for a particular K bit block would lead to fewer bits, padding bits are added.

According to one or more embodiments, responsive to determining that a particular K bit block would lead to more bits (e.g., an overflow situation), only N bits are transmitted for each the respective K bit block. Namely, when overflow occurs for the respective K bit block, the number of transmitted bits remains the same, such that the N bits and some of the payload bits within the K bit block are not transmitted.

In Table 2, examples for possible block lengths and overhead that can be used with small overflow probability are shown, where the shaping encoder rate is calculated by Equation (1). The rate deviation due to the framing for different payload length is shown in FIG. 3A, where the encoder rate decreases with the overhead percentage as $$R_{framing} = \frac{K}{R_{shaping} N}..$$

TABLE 2

Overhead bits and corresponding overflow prob.

| K | Shaping Encoder Rate | N | Overhead [%] | Overflow probability |
|---|---|---|---|---|
| 1 KB | 0.908 | 1.112 KB | 1.1 | 5e−3 |
| 2 KB | 0.908 | 2.210 KB | 0.75 | 3e−3 |
| 4 KB | 0.908 | 4.428 KB | 0.6 | 3e−3 |
| 8 KB | 0.908 | 8.84 KB | 0.4 | 4e−3 |

According to one or more embodiments, the FTF shaping encoding system 142 may frame the remaining bits after grouping the first payload bits into the K bit blocks 305. The FTF shaping encoding system 142 may use one or multiple blocks whose payload size(s) are smaller than K bits, and whose overhead bit percentage(s) are the same as or larger than the previous K-bit block. For example, the FTF shaping system 142 may let the number of remaining payload bits to be less than K bits, where one smaller block may be enough to carry the remaining payload bits.

According to one or more embodiments, the FTF system 142 may frame the K bit blocks such that the number of remaining payload bits for each block are not less than K bits and less than 2K bits, and use two smaller blocks to carry the remaining payload bits. In one aspect, the remaining payload bits (padding bits) may include one or more random bits. Accordingly, the decoder may simply discard or ignore the padding bits, and random values may be used for the padding.

According to another aspect, the padding comprises a repetition of a portion of the K bit block. This may serve as a redundancy for recovering data lost in a respective K bit block.

Figure 3B:
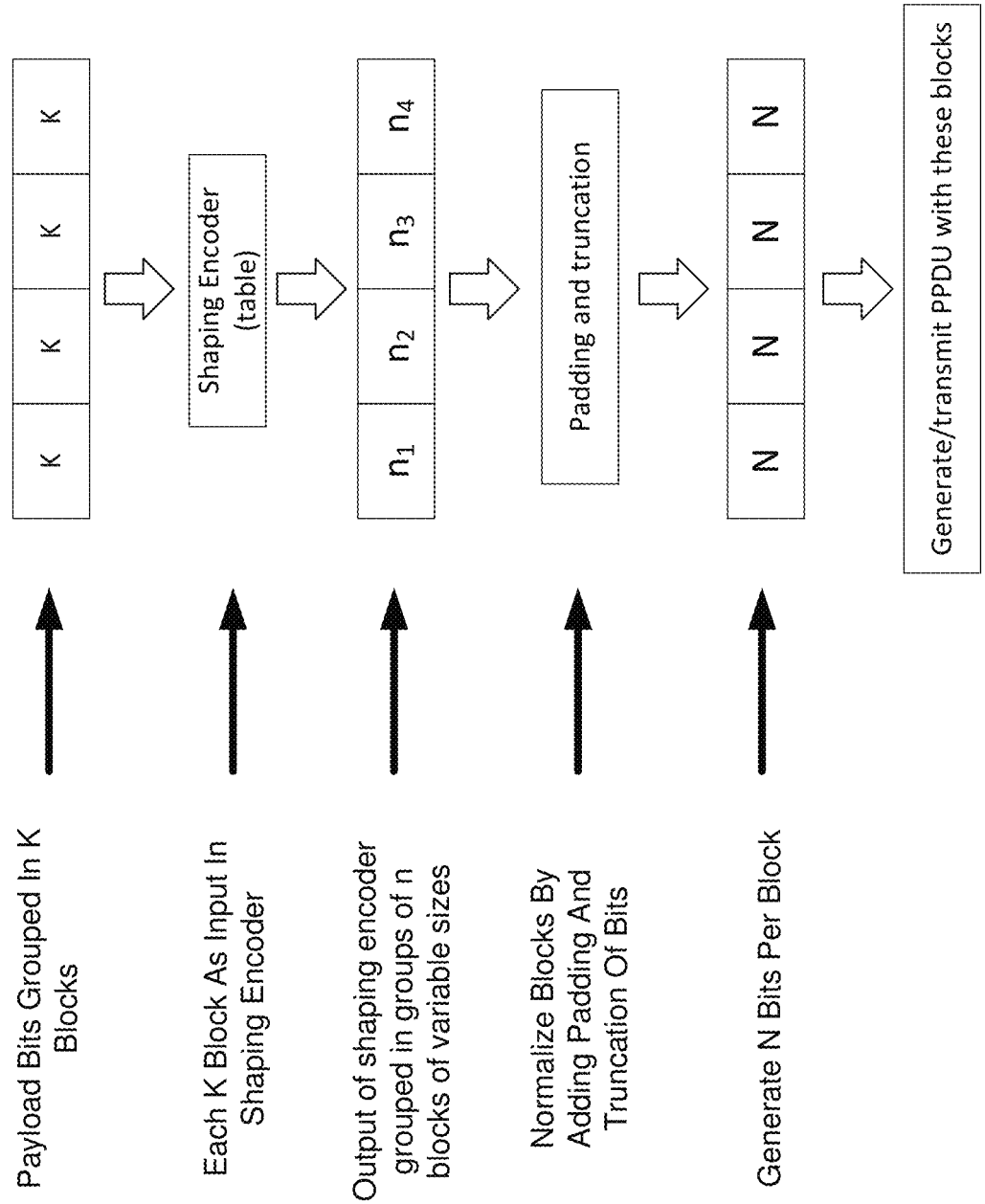
FIG. 3B depicts an example of constellation shaping using a shaping encoder at a transmitting device, in accordance with one or more example embodiments of the present disclosure.

FIG. 3B depicts an example of constellation shaping using a shaping encoder at a transmitting device, in accordance with one or more example embodiments of the present disclosure.

In one or more embodiments, the FTF shaping encoding system 142 may determine payload bits that may be bits (e.g., data for a video, data, etc.) that are to be sent to a receiving device. These payload bits will go through encoding before being transmitted to the other device. A step of encoding comprises using constellation shaping which is based on a shaping encoder. Before going into the shaping encoder, the payload bits are grouped in K blocks of a fixed size (e.g., 1 Kbytes or 2 Kbytes, 4 Kbytes, 8 Kbytes, or any other size). That is the payload bits are divided into blocks. Each block has K bits. The last block may have less than K bits.

In one or more embodiments, the FTF shaping encoding system 142 may facilitate that each block of K payload bits will need to be encoded into N shaped bits (or amplitude bits) by the shaping encoder and bit padding processing. The shaping encoder is the lookup table (see. Table 3 below), where input bits will be converted to output bits based on the amplitude. For example, K=8000 bits and N=10000 bits, a specific block of 8000 bits are encoded using the shaping encoder into, e.g., 9500 shaped (or amplitude) bits that are usually less than 10000 bits. That is the 8000 bits may be converted using Table 3 to generate an output of shaped (or amplitude) bits that may be equal to 9500 bits (size of n1, n2, n3, or n4, where n represent a number of bits that are generated through the shaping encoder for each K block). However, a second set of K bits of 8000 bits may result in a different size of output of shaped (or amplitude) bits (size of n1, n2, n3, or n4) because of the conversion of the shaping encoder using, for example, Table 3. For that reason, it would be beneficial if the output of the shaping encoder is normalized to a block of N bits for each K input bits. In order to do so, N can be selected to be larger than the output of the shaping encoder. For example, N can be selected to be 10000 bits. However, this is more than what the shaping encoder had output, meaning that padding is needed to fill up the block of 10000 shaped bits. The padding can occur either in the payload bits or in shaped bits. That is either the K blocks may be padded with some bits to generate an N block of bits, or the output of the shaping encoder may be padded to result in N block of bits for each of K block of bits. In the case of payload bit padding, the padding payload bits can be generated from the K payload bits in the same block, e.g., repeating the first payload bits. The generated padding payload bits are then encoded by the shaping encoder and the output shaped bits are used as the padding bits to fill up the N bit block. In the case of shaped bit padding, the padding shaped bits can be generated from the initial shaped bits, e.g., the 9500 shaped bits, e.g., repeating the first shaped bits. In either of the two cases, the padding bits to fill up the N bit block may be generated from the K payload bits directly or indirectly. The example of FIG. 3B shows the padding occurring at the output of the shaping encoder, which may be padded to result in N block of bits for each of K block of bits.

In some embodiments, the padding bits may not be generated from the initial K payload bits or their corresponding shaped bits. They may be some random or constant bits just for filling up the N-bit block.

In one or more embodiments, the N blocks, each having a same size of N bits, are then sent to the quadrature amplitude modulation (QAM) mapper for constellation mapping (together with sign bits that are generated from the N bits). Some part of the N bits may be converted to sign bits, e.g., by masking or scrambling.

In one or more embodiments, after the QAM mapping, the blocks are then transmitted to the receiving device, wherein the reverse operation occurs in order to retrieve the payload bits. That is, removing the padding and going through a shaping decoder.

It is understood that the above descriptions are for purposes of illustration and are not meant to be limiting.

Figure 4:
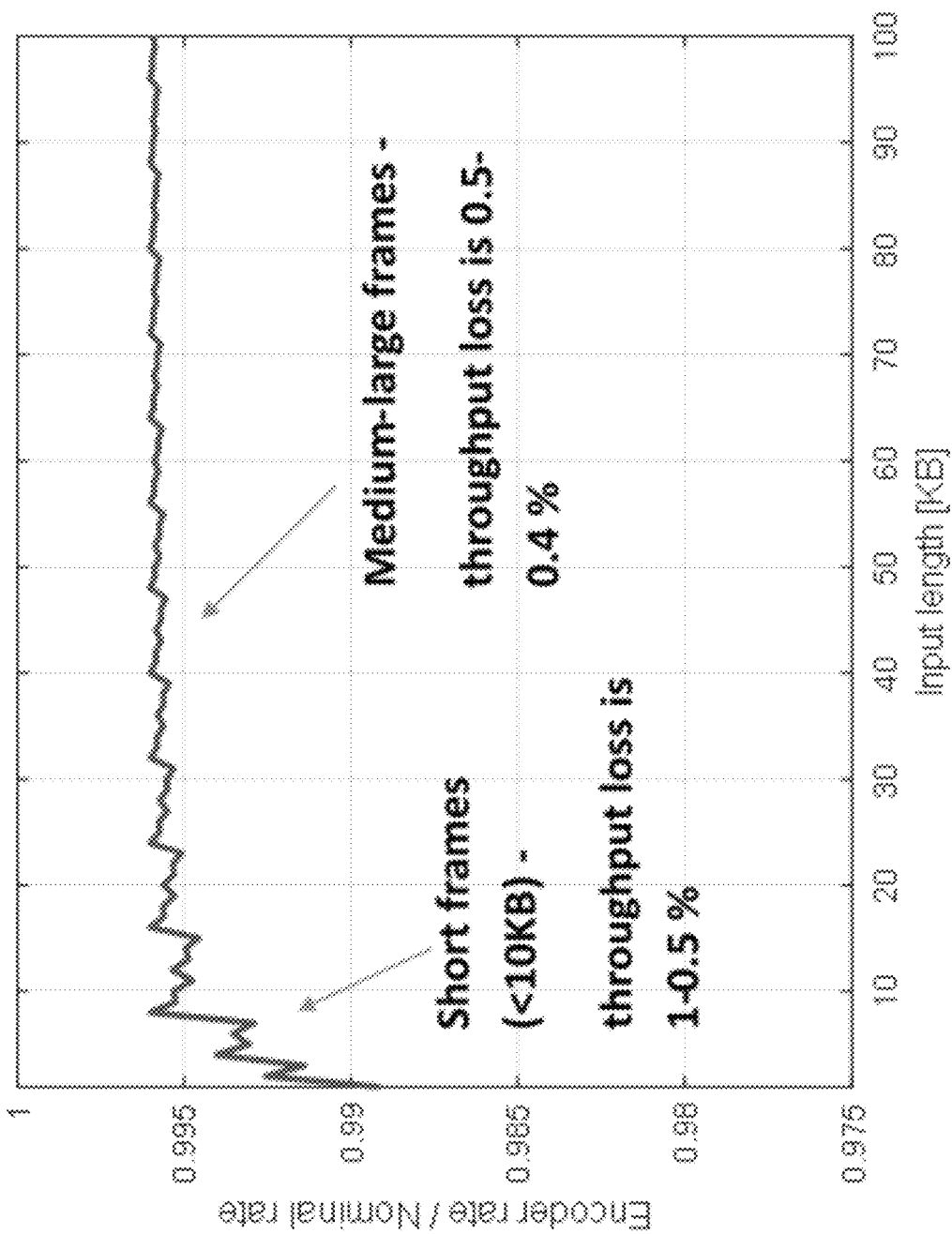
FIG. 4 illustrates encoder PER test results with respect to signal to noise ratio (SNR) in accordance with one or more example embodiments of the present disclosure.

FIG. 4 illustrates encoder PER test results with respect to signal to noise ratio (SNR) in accordance with one or more example embodiments of the present disclosure. As illustrated in the graph 400, shorter frames (e.g., frames less than 10 KB) may experience a throughput loss between 0.5%-1.0%. In cases where frames are medium to large, the throughput loss is 0.5% to 0.4%.

Figure 5:
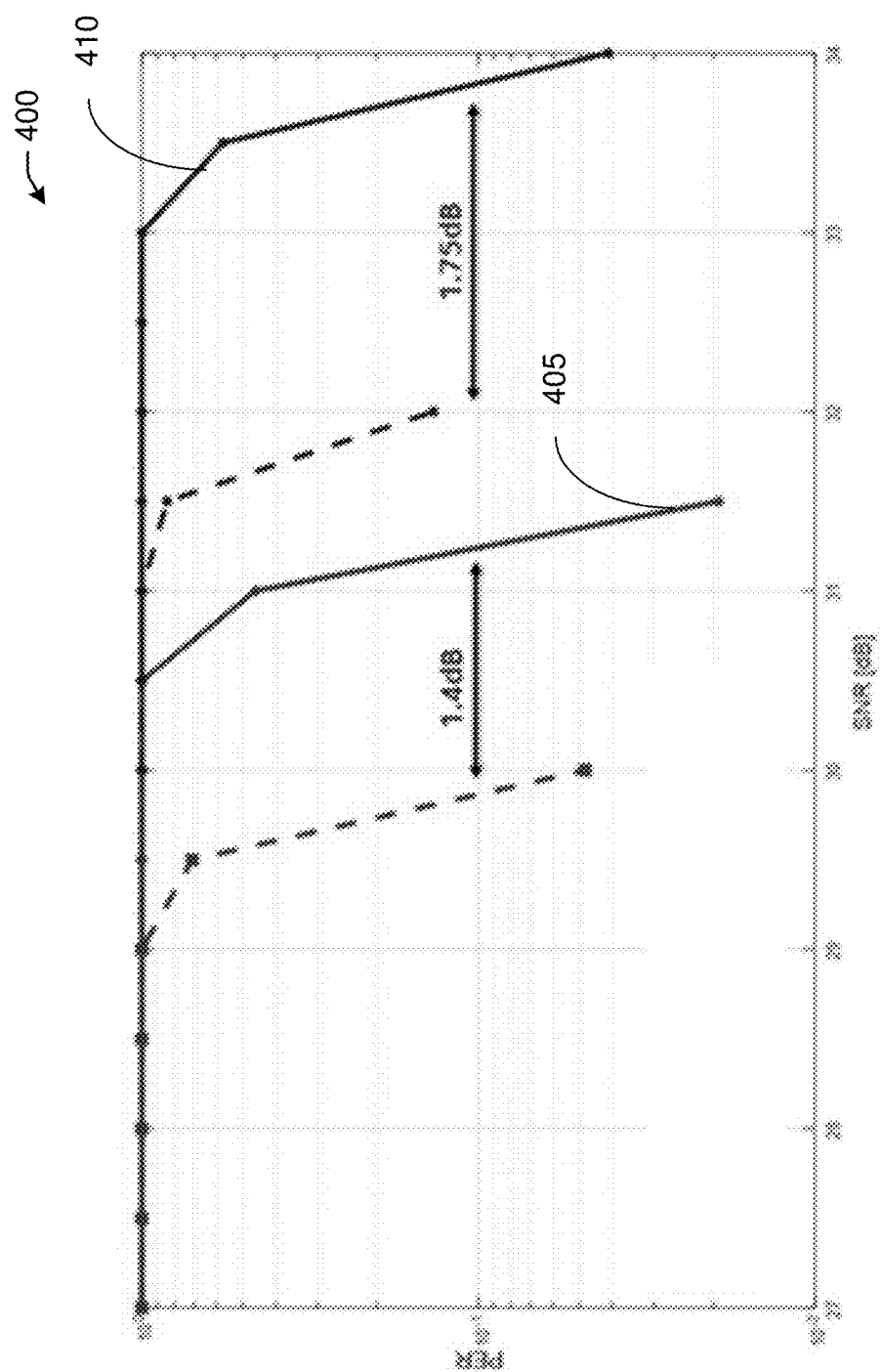
FIG. 5 illustrates results for simulation results in accordance with one or more example embodiments of the present disclosure.

FIG. 5 depicts an example of block-wise shaping encoding results, in accordance with one or more example embodiments of the present disclosure. With respect to the experimental setup, additive white Gaussian noise (AWGN) was used as a basic noise model to mimic the effect of random process that may occur naturally in the operating environment. A single transmit antenna and 1 receive antenna (1×1) were used. Table 2 provides the encoding and framing information used with respect to the block-wise shaping results 400. The Aggregate MAC Protocol Data Unit (AMPDU) consisted of 20 4 KB packets.

As illustrated in FIG. 4, for MCS-12 405, the FTF shaping encoding system 142 can achieve 1e-1 PER with 1.4 dB gain. This result represents the effective gain, considering rate deviation, is 1.5 dB.

For MCS-13 410, the FTF shaping encoding system 142 may achieve 1e-1 PER with 1.75 dB gain. The effective gain, considering rate deviation, is 0.85 dB.

According to another embodiment, a second technique is described that enables the separation between MPDUs in constellation shaping (CS) scheme even in the cases of PHY errors.

One or more embodiments may add PHY delimiter sequences that symbolize the end of each segment. Thus, errors may be limited only to single segments and do not propagate to the neighboring ones. The FTF shaping encoding system 142 may define a search procedure that locates the delimiters with low complexities even if they are shifted due to errors. One advantage of this method is that it precludes error propagation. As the MPDUs are separated, errors are confined within the individual MPDUs in which they occur. Consequently, re-transmission is required only for the MPDUs that contain errors, and not for the entire A-MPDU.

The FTF shaping encoding system 142 may transform uniformly distributed bits sequence into amplitudes (positive values only), and into their corresponding Gray mapping. Basically, the encoder is a mapping table, which describes a prefix code.

Each sequence of bits at the input of the shaping encoder may be mapped into an amplitude. The mapping table is constructed in such a way that the probabilities of the amplitudes will be according to some desired distribution, which are optimized in advance. The matching between a specific bit sequence and an amplitude is done by calculating the probability to get the specific bit sequence. Since the probability to get a bit sequence is always dyadic, i.e. can be written as $2^{-k}$ where k is integer.

Table 3 illustrates a short and simple example for shaping an encoder mapping table. Consider the probabilities set [1/2, 1/4, 1/8, 1/8]. If a random bit sequence is observed, the probability that the first bit is '0' is 0.5, therefore '0' may be mapped into amplitude 1. Meaning that if '0' is observed as the first bit, it is mapped into amplitude 1 and continue to the next bits. Follows, if '10' is received—amplitude 3 would be the output. This will occur a probability 0.25 as desired. The completing bit sequences in this case would be '110' and '111', which are given the amplitudes 5 and 7, and have exactly the probability of 1/8. The amplitudes are then mapped into output bits using Gray code mapping.

TABLE 3

Example For Shaping An Encoder Mapping Table

| Input | Index | Amplitude | Output Bits | Prob. Of Sequence |
|---|---|---|---|---|
| 0 | 1 | 1 | 10 | 1/2 |
| 10 | 2 | 3 | 11 | 1/4 |
| 110 | 3 | 5 | 01 | 1/8 |
| 111 | 4 | 7 | 00 | 1/8 |

Example: Bin=(010011100110)->amplitude=(1 3 1 7 1 1 5)->Bout=(10111000101001)

At the receiver, inverse operation is applied—shaping decoding.

The FTF shaping encoding system 142 may transforms a fixed-length bit sequence into the sequence from which it is generated. An example is shown in Table 4.

TABLE 4

Example for shaping decoder (at
a receiving device) mapping table.

| Input | Output bits |
|---|---|
| 10 | 0 |
| 11 | 10 |
| 01 | 110 |
| 00 | 111 |

In current Wi-Fi standards, the transmitted bit stream is separated into MPDUs. Each MPDU starts with a delimiter that contains information on the MPDU such as the number of Bytes. The delimiter also contains a delimiter signature Byte, which is a unique pattern used for detecting delimiters. For example, the signature byte is set to the ASCII character "N" for easing the search of the delimiter. In practical systems, MAC searches for the delimiter signature and uses it to separate between MPDUs. The search is usually done over several Bytes (not every bit), and not over the entire sequence to reduce the probability of miss-detect. This separation between MPDUs is crucial. In the presence of errors, only the MPDUs that had errors are not correctly received and require re-transmissions.

In the case of CS, however, using the MPDU delimiter signature is not trivial. Since errors may cause bit erasures and bit additions, the location of the delimiter signature remains unknown, and a single error may cause the entire A-MPDU to collapse.

Figure 6:
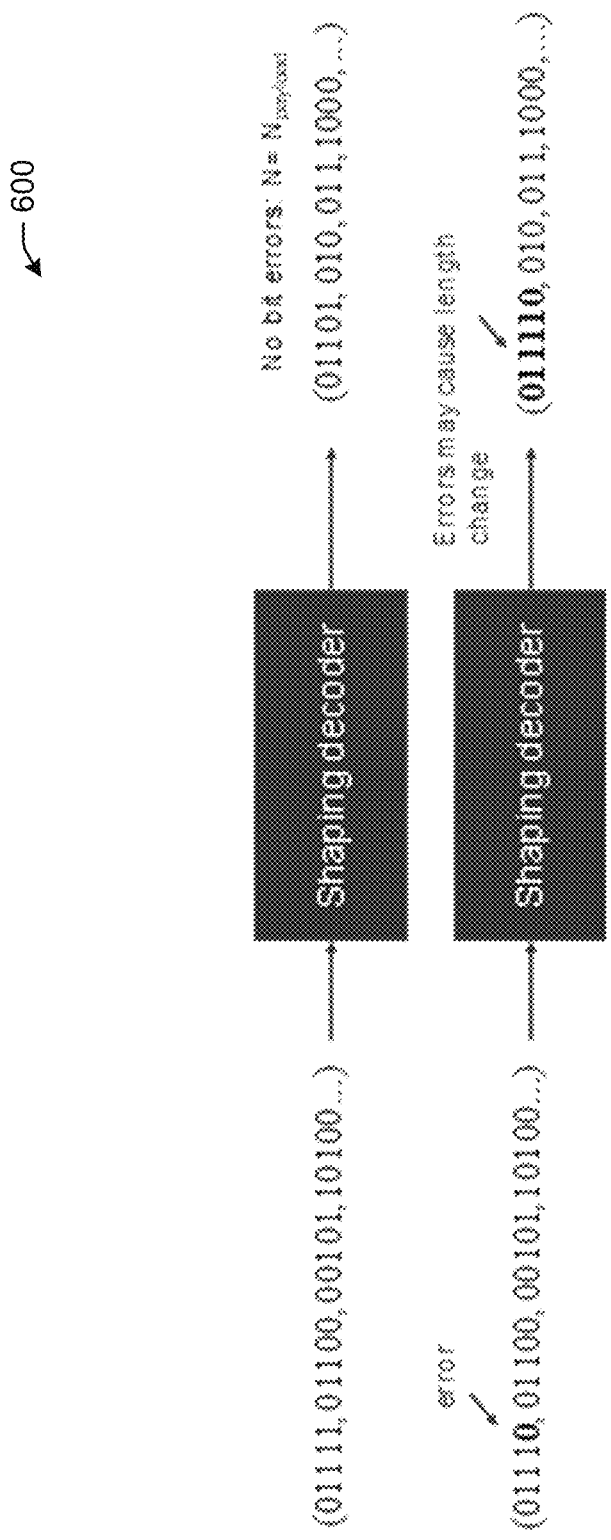
FIG. 6 depicts an example of block-wise shaping encoding in accordance with one or more example embodiments of the present disclosure.

The effect of errors is illustrated in FIG. 6. Each 5 bits of input represent amplitude. If for some reason the amplitude is wrong, which may be caused by noise or interference in the wireless channel, a corresponding wrong amplitude results. In one example, the amplitude may be misread as an amplitude 15 when the intended amplitude is 13. This may result in a bit error in the conventional systems.

Figure 7:
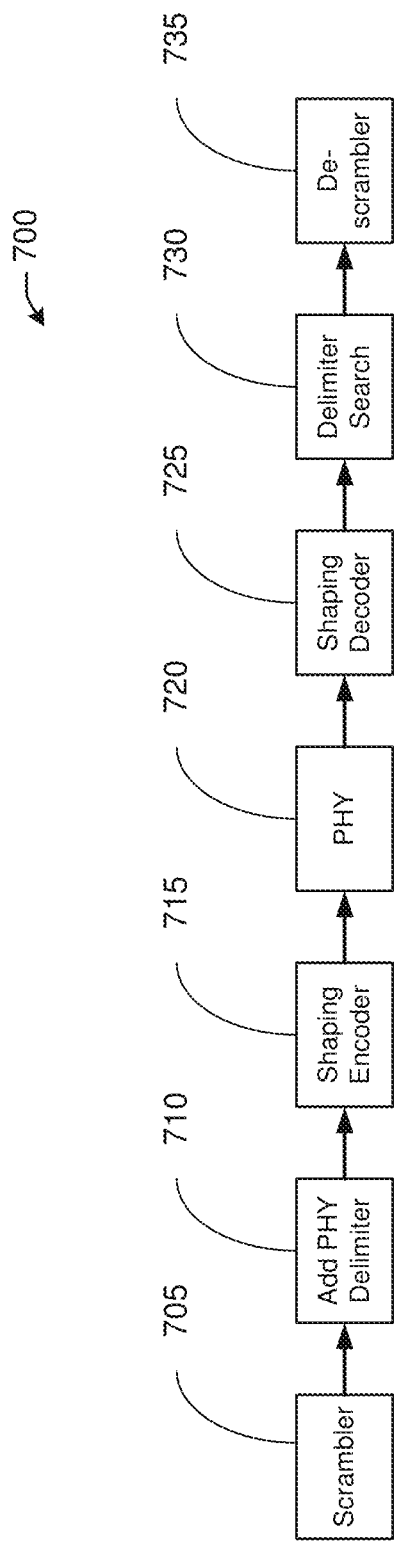
FIG. 7 illustrates a graph showing probability of length deviation for a number of byte payload segments in accordance with one or more example embodiments of the present disclosure.

FIG. 7 illustrates a flow diagram of a process 700 for avoiding error propagation using PHY delimiters, in accordance with one or more embodiments. An error propagation in constellation shaping system (e.g., the FTF shaping encoding system 142) may receive data from a scrambler 705 and add a PHY delimiter 710 for every PHY segment, which may have a fixed number of Bytes, e.g. 1 k Bytes or 1024 Bytes. The shaping encoder 715 may apply shaping encoding on the payload delimiters. At the PHY 720, BER is added to the shaped sequence.

The shaping decoder at 725 may apply shaping decoding, and the delimiter search step 730 may search with a margin of 1 Byte. Finally, the output is de-scrambled at step 735.

At the operating bit-error-rate point of interest, the deviation of the output length after shaping decoder 725 can be bounded and predicted with high accuracy.

Figure 8:
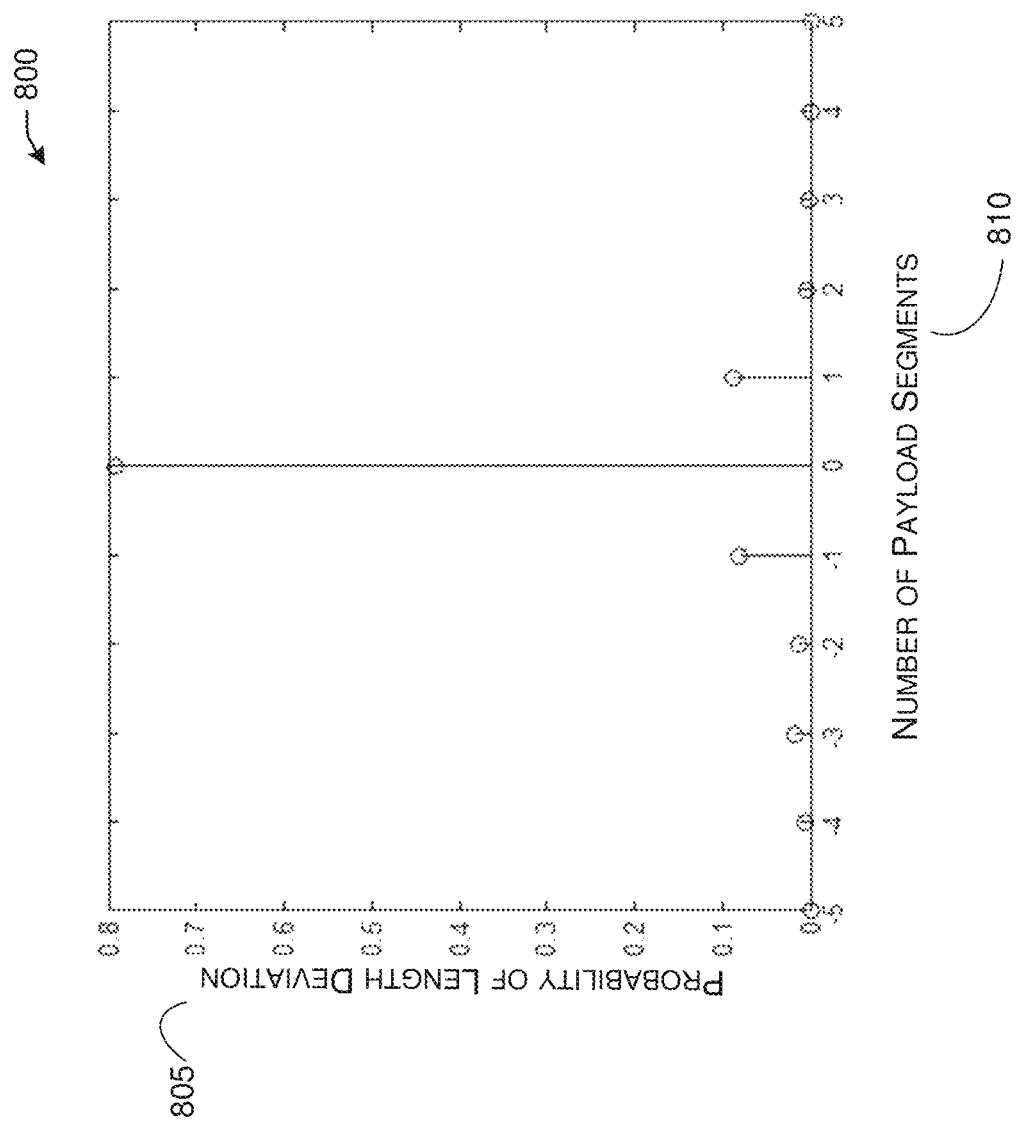
FIG. 8 illustrates a plurality of options of the PHY delimiter in accordance with one or more example embodiments of the present disclosure.

FIG. 8 illustrates a graph 800 showing probability of length deviation 805 for a number of byte payload segments 810, in accordance with one or more example embodiments of the present disclosure. The graph 800 shows the probability of length deviation for 1 k (or 1024) Byte payload segments at packet error rate of 15%. It can be seen that the deviation of the output length for 1 k byte input would be within 3 bits with extremely high probabilities. Namely, the probability of the length change that is smaller or greater than 1 k bytes by more than 3 bits is extremely small. For the results in FIG. 8, the PHY segment is of 1 k bytes and the bit error rate (BER) is 0.01%. The probability that the PHY delimiter location is within 1, 2, and 3 bits of the error free location are 96%, 98%, and 99.5%, respectively. Therefore, the PHY delimiter may be search for only within a small neighborhood (e.g. 7-8 bit positions) around the expected location of the PHY delimiter.

In FIG. 8, it should be noticed that the PHY delimiter is not scrambled so that the synchronization between the unscrambling sequence and the shaping decoder output is not required for the receiver to locate the PHY delimiter.

Another advantage of the PHY delimiter approach is that it maintains the PHY-MAC separation principle. Since the PHY delimiters are used, the entire procedure is transparent for the MAC. In addition, the PHY does not require any knowledge from the MAC to apply the separation between segments.

Figure 9:
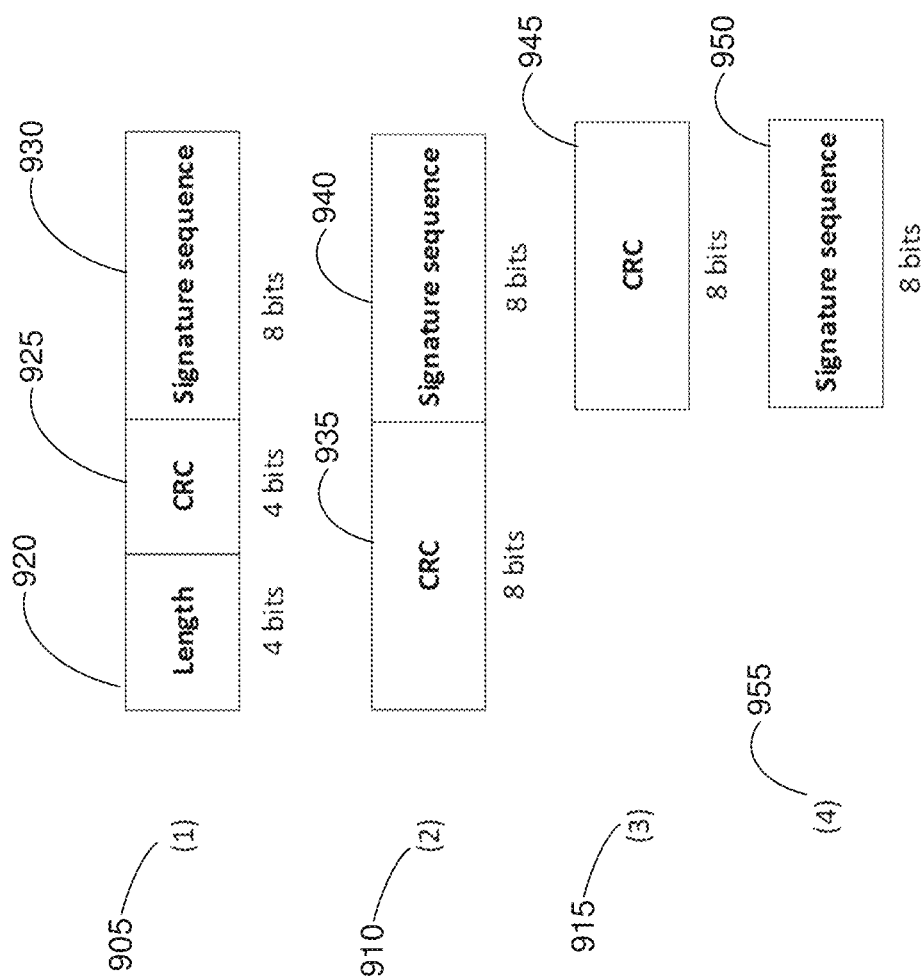
FIG. 9 depicts a true PHY delimiter and a fake PHY delimiter in accordance with one or more example embodiments of the present disclosure.

Four structures of the PHY delimiter are illustrated in FIG. 9. A first structure 905, depicted on the top row, consists of three components: length field 920, a CRC field 925, and a signature sequence 930. This structure is similar to the existing MAC MPDU delimiter. The signature sequence is for the ease of searching. Once a match of the signature sequence is detected, the length field and the CRC are checked. The CRC is calculated from the length field and maybe other payload bits e.g. 8 scrambled bits immediately before the length field. If the CRC passes, the delimiter is detected and the receiver will look for the next delimiter, which may be at a known location e.g. 1024 bytes away. One advantage of the first structure 905 is the low false alarm rate. One downside of the structure 905 is the large overhead and high complexity. The length field 920 may only include the least significant bits of the PHY segment count for reducing the overhead.

A second structure 910 is shown that does not include the length field 920 for simplicity. Since the PHY segment length is much longer than the length changes due to the decoding errors, it is almost impossible to miscount the number of PHY segments, there is no need for the length field 920. The CRC 935 may be calculated for some payload bits e.g. the 8 scrambled bits immediately before the CRC field.

A third structure 915 is depicted that does not include the length field 920 and signature sequence 930 for low overhead. The CRC 945 may be calculated for some payload bits e.g. the 8 scrambled bits immediately before the CRC field. Because the signature sequence 940 is not included, the receiver needs to search for the CRC 935 around the expected or nominal location of the PHY delimiter bit by bit. The downside is the increased false alarm rate.

A fourth structure 955 is illustrated that only includes the signature sequence 950 for simplicity and low overhead. The downside is the increased false alarm rate.

Since using a length that is a power of 2 may simplify the implementation, the lengths of PHY segment, PHY delimiter, and PHY delimiter may be a power of 2.

Figure 10:
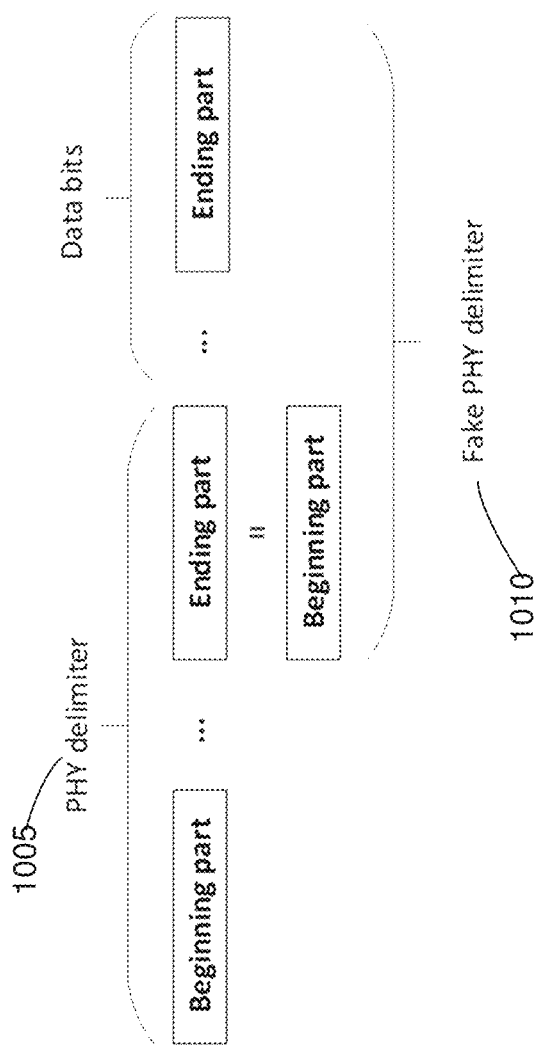
FIG. 10 illustrates a graph showing auto-correlation values of an 8-bit signature sequence extended from the 7-bit Barker code in accordance with one or more example embodiments of the present disclosure.

FIG. 10 depicts a true PHY delimiter 1005 and a fake PHY delimiter 1010, in accordance with one or more example embodiments of the present disclosure. For backward compatibility, the signature sequence of MAC MPDU delimiter may be reused for PHY. However, there may be better solutions from the performance perspective. For minimizing the false alarm rate, the signature sequence should be sensitive to bit shift or should have a good auto-correlation property. Namely, the inner product (or matched filtering) of the signature sequence and the shifted signature sequence should be small. For example, [−1, −1, −1, −1, −1, −1, −1, −1] is not a good signature sequence. The inner product of [−1, −1, −1, −1, −1, −1, −1, −1, 0] and [0, −1, −1, −1, −1, −1, −1, −1, −1] is 7 that only differs from the perfectly matched output 8 by 1. If the bit adjacent to the signature sequence is also −1, then the receiver has a problem to find the exact location of the PHY delimiter.

This is illustrated in FIG. 10. If the beginning part and the ending part of PHY delimiter are the same, there is a chance that the ending (or beginning) part and the random data bits adjacent to the PHY delimiter form a fake PHY delimiter after (or before) the true PHY delimiter. In this case, the receiver may not be able to tell which is the true PHY delimiter.

Figure 11:
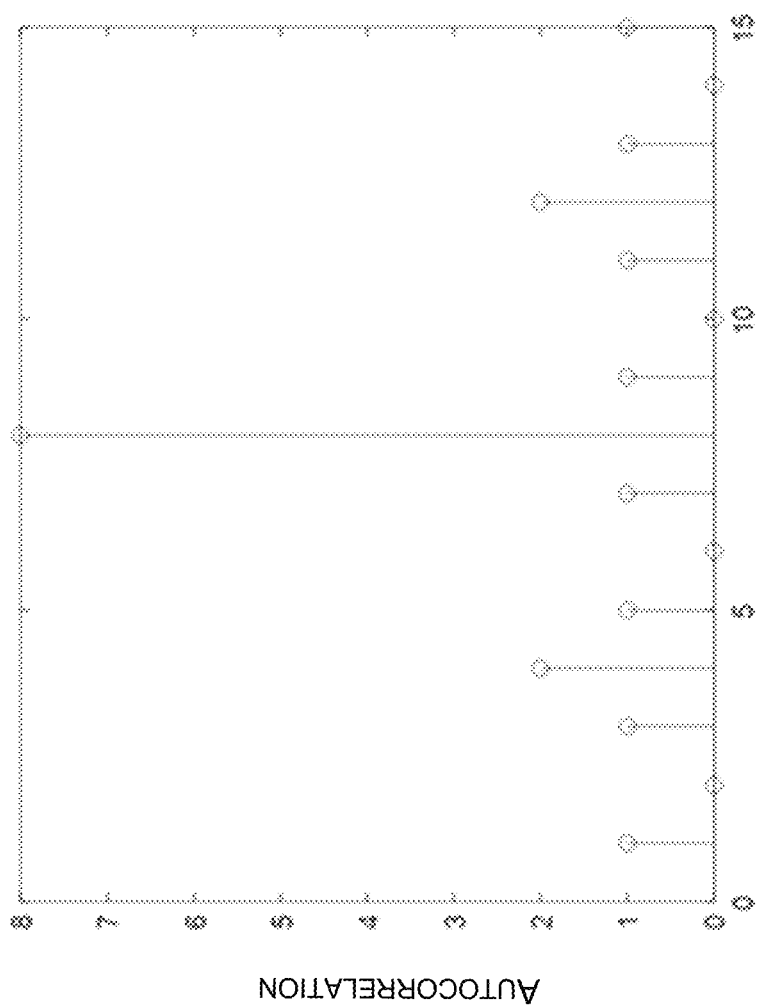
FIG. 11 illustrates a graph showing auto-correlation values of a 9-bit signature sequence extended from the 7-bit Barker code in accordance with one or more example embodiments of the present disclosure.
Figure 12:
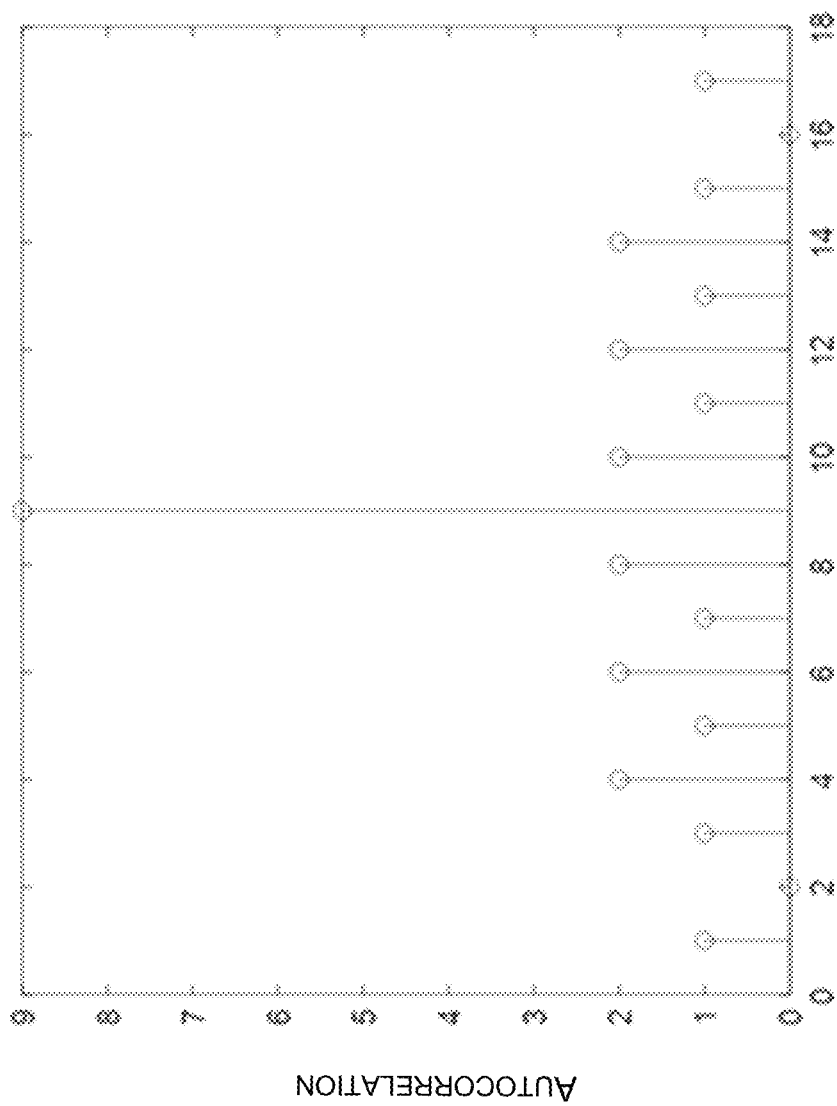
FIG. 12 illustrates a graph showing auto-correlation values of an 8-bit signature sequence using 8-bit Golay code in accordance with one or more example embodiments of the present disclosure.
Figure 13:
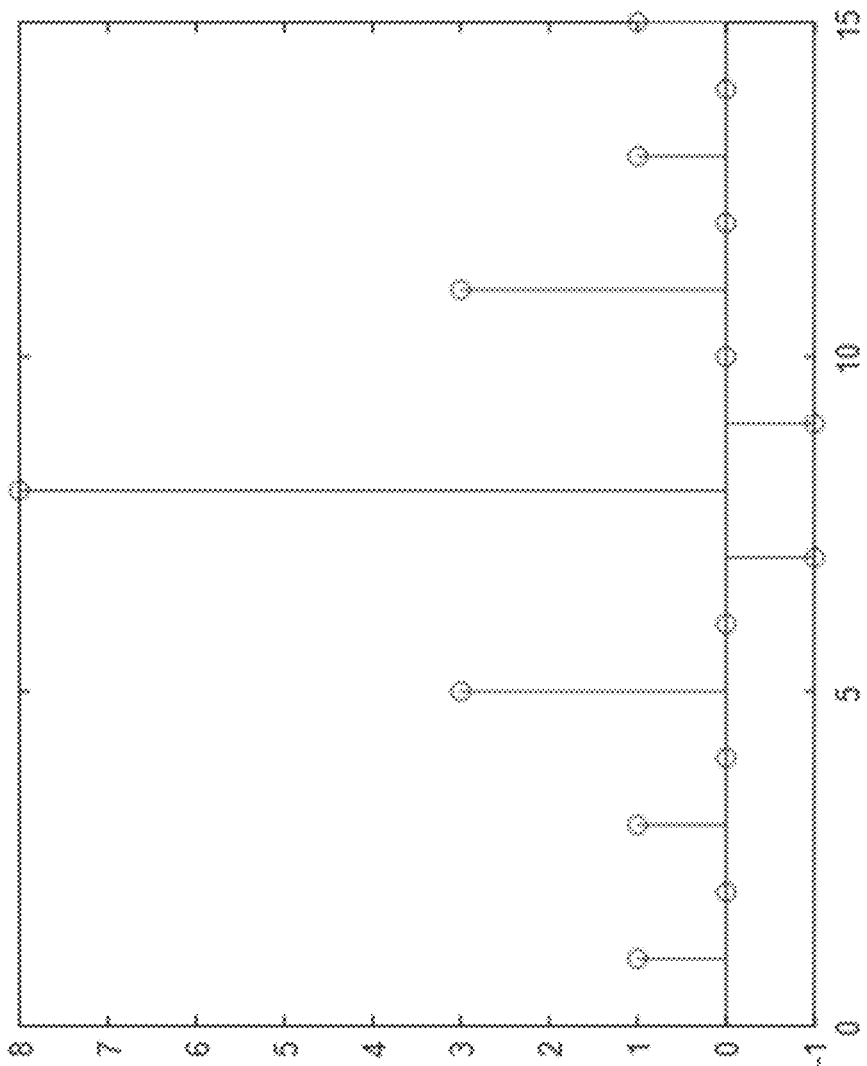
FIG. 13 illustrates a flow diagram of illustrative process for an illustrative fixed-to-fixed shaping encoding system, in accordance with one or more example embodiments of the present disclosure.

Barker codes and Golay complementary codes are codes with good auto-correlation properties, which mitigate the problem shown FIG. 10. One can extend the 7-bit Barker code [1 1 1 −1 −1 1 −1] to a 8-bit signature sequence [1 1 1 1 −1 −1 1 −1] and a 9-bit signature sequence [1 1 1 1 1 −1 −1 1 −1], whose linear auto-correlations are shown in FIG. 11 and FIG. 12, respectively. The auto-correlation of 8-bit Golay code [1, 1, 1, −1, 1, 1, −1, 1] as the signature sequence is shown in FIG. 13. The auto-correlation functions are close to the delta function such that it takes multiple decoded bit errors to trigger the false alarm and a partial match may be sufficient to synch the PHY delimiter. The 9-bit sequence should have a lower false alarm rate than the 8-bit one. The 9-bit sequence makes use of the previous (or the subsequent) payload bit to complete the signature sequence. If the previous payload bit is 1, then the appended 8-bit signature code is [1 1 1 1 −1 −1 1 −1] such that the completed signature code is [1 1 1 1 1 −1 −1 1 −1] same as 9-bit signature sequence. If the previous payload bit is −1, then the appended 8-bit signature code is [−1 −1 −1 1 1 −1 1 1] such that the completed signature code is −[1 1 1 1 1 −1 −1 1 −1] the sign flipped 9-bit signature sequence. Namely, the inserted signature sequence flips its polarity according to a payload bit, which may be the one adjacent to the sequence. This polarity flip effectively increases the signature sequence length by 1 such that the false alarm rate and mis-detect rate are reduced.

In current Wi-Fi standards, the PHY scrambles the payload bits received from the MAC. The scrambling is for changing the PAPR across the initial transmission and the retransmissions. Since the existing scrambling imposes a challenge in synchronizing the decoded bit sequence and the unscrambling sequence, new ways may be proposed to change the PAPR for the transmissions.

Several methods are described may be used individually or jointly to prevent error propagation using scrambling processes. In a first method, instead of scrambling the PHY payload bits, the sign bits of the (QAM) constellation mapping may be scrambled and keep the amplitude bits unscrambled for retaining the shaping gain. By changing the signs of the QAM symbols, the PAPR changes.

According to a second method, instead of scrambling, the QAM symbols may be mapped to the subcarriers differently across the initial transmission and the retransmissions. This method needs to take the frequency diversity into account. For example, the QAM symbol sequences may be cyclically shifted before mapping to the subcarriers by a different amount for each transmission. It is understood that the above descriptions are for purposes of illustration and are not meant to be limiting.

It is understood that the above descriptions are for purposes of illustration and are not meant to be limiting.

Figure 14:
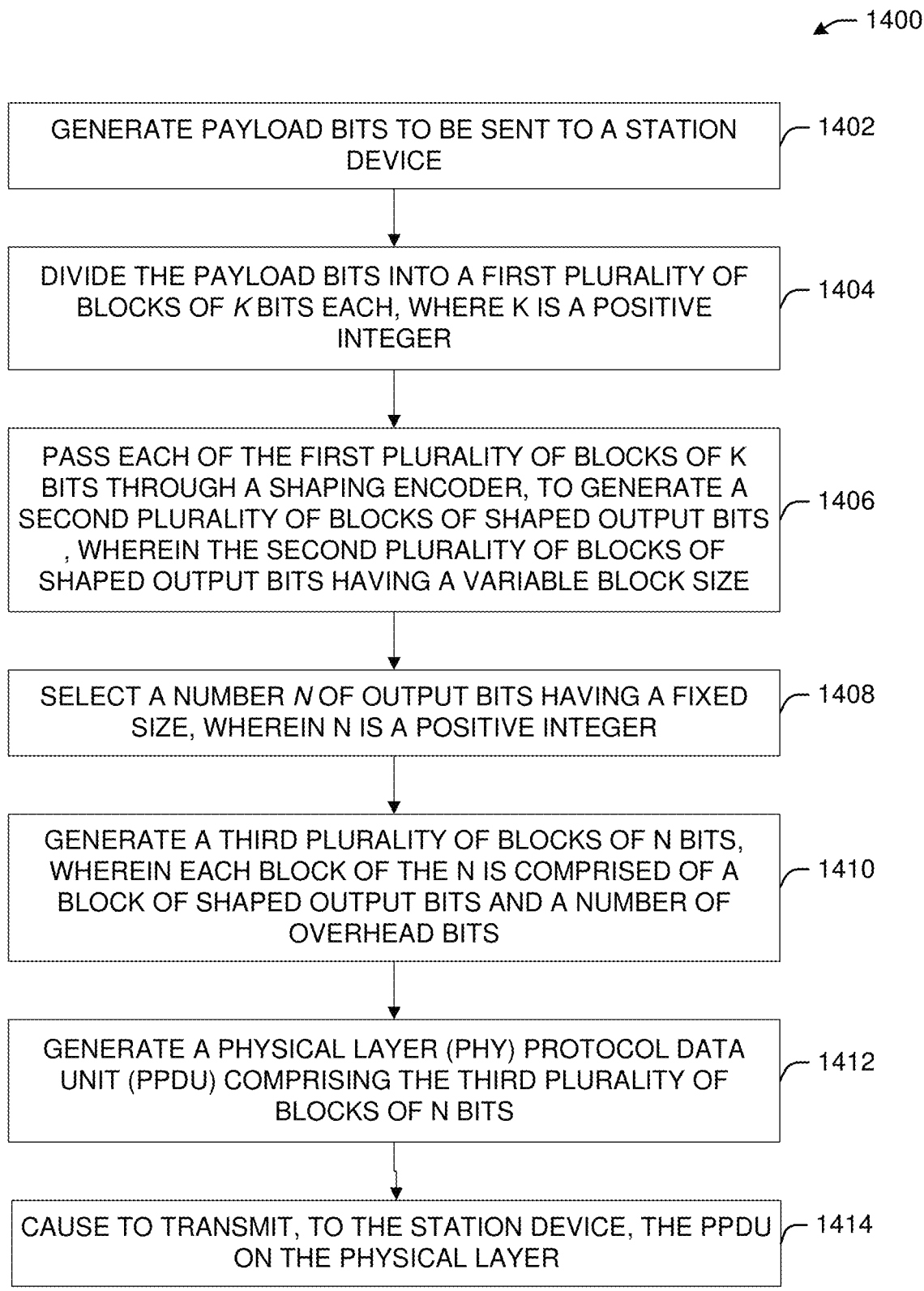
FIG. 14 illustrates a flow diagram of illustrative process for a constellation shaping in accordance with one or more embodiments.

FIG. 14 illustrates a flow diagram of illustrative process 1400 for a fixed-to-fixed shaping encoding, in accordance with one or more example embodiments of the present disclosure.

At block 1402, a device (e.g., the user device(s) 120 and/or the AP 102 of FIG. 1) may generate payload bits to be sent to a station device.

At block 1404, the device may divide the payload bits into a first plurality of blocks of K bits each, where K is a positive integer.

At block 1406, the device may pass each of the first plurality of blocks of K bits through a shaping encoder, to generate a second plurality of blocks of shaped output bits, wherein the second plurality of blocks of shaped output bits having a variable block size.

At block 1408, the device may select a number N of output bits having a fixed size, wherein N is a positive integer. The number N of output bits is based on a probability of overflow associated with an overhead bit percentage of K bits. The device may determine the number of overhead bits based on requirements for low overflow.

At block 1410, the device may generate a third plurality of blocks of N bits, wherein each block of the N is comprised of a block of shaped output bits and a number of overhead bits.

At block 1412, the device may generate a physical layer (PHY) protocol data unit (PPDU) comprising the third plurality of blocks of N bits. The device may determine that at least one of the second plurality of blocks of shaped output bits is larger than the selected number N of output bits. The device may transmit, to the station device, the PPDU on a physical layer without a last set of bits of a last block of K bits. Padding may be applied when at least one of the second plurality of blocks of shaped output bits is smaller than the selected number N of output bits. The device may determine that at least one of the second plurality of blocks of shaped output bits is smaller than the selected number N of output bits. The device may add one or more padding bits to the at least one of the second plurality of blocks of shaped output bits. The padding may comprise one or more random bits. The padding may comprise a repetition of a portion of at least one of the first plurality of blocks of K bits.

At block 1414, the device may cause to transmit, to the station device, the PPDU on the physical layer.

It is understood that the above descriptions are for purposes of illustration and are not meant to be limiting.

FIG. 15 shows a functional diagram of an exemplary communication station 1500, in accordance with one or more example embodiments of the present disclosure. In one embodiment, FIG. 15 illustrates a functional block diagram of a communication station that may be suitable for use as an AP 102 (FIG. 1) or a user device 120 (FIG. 1) in accordance with some embodiments. The communication station 1500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1500 may include communications circuitry 1502 and a transceiver 1510 for transmitting and receiving signals to and from other communication stations using one or more antennas 1501. The communications circuitry 1502 may include circuitry that can operate the physical layer (PHY) communications and/or medium access control (MAC) communications for controlling access to the wireless medium, and/or any other communications layers for transmitting and receiving signals. The communication station 1500 may also include processing circuitry 1506 and memory 1508 arranged to perform the operations described herein. In some embodiments, the communications circuitry 1502 and the processing circuitry 1506 may be configured to perform operations detailed in the above figures, diagrams, and flows.

In accordance with some embodiments, the communications circuitry 1502 may be arranged to contend for a wireless medium and configure frames or packets for communicating over the wireless medium. The communications circuitry 1502 may be arranged to transmit and receive signals. The communications circuitry 1502 may also include circuitry for modulation/demodulation, upconversion/downconversion, filtering, amplification, etc. In some embodiments, the processing circuitry 1506 of the communication station 1500 may include one or more processors. In other embodiments, two or more antennas 1501 may be coupled to the communications circuitry 1502 arranged for sending and receiving signals. The memory 1508 may store information for configuring the processing circuitry 1506 to perform operations for configuring and transmitting message frames and performing the various operations described herein. The memory 1508 may include any type of memory, including non-transitory memory, for storing information in a form readable by a machine (e.g., a computer). For example, the memory 1508 may include a computer-readable storage device, read-only memory (ROM), random-access memory (RAM), magnetic disk storage media, optical storage media, flash-memory devices and other storage devices and media.

In some embodiments, the communication station 1500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1500 may include one or more antennas 1501. The antennas 1501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1500 may include one or more of a keyboard, a display, a non-volatile memory port, multiple antennas, a graphics processor, an application processor, speakers, and other mobile device elements. The display may be an LCD screen including a touch screen.

Although the communication station 1500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1500 may include one or more processors and may be configured with instructions stored on a computer-readable storage device.

FIG. 16 illustrates a block diagram of an example of a machine 1600 or system upon which any one or more of the techniques (e.g., methodologies) discussed herein may be performed. In other embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environments. The machine 1600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a power management device 1632, a graphics display device 1610, an alphanumeric input device 1612 (e.g., a keyboard), and a user interface (UI) navigation device 1614 (e.g., a mouse). In an example, the graphics display device 1610, alphanumeric input device 1612, and UI navigation device 1614 may be a touch screen display. The machine 1600 may additionally include a storage device (i.e., drive unit) 1616, a signal generation device 1618 (e.g., a speaker), a fixed-to-fixed shaping encoding device 1619, a network interface device/transceiver 1620 coupled to antenna(s) 1630, and one or more sensors 1628, such as a global positioning system (GPS) sensor, a compass, an accelerometer, or other sensor. The machine 1600 may include an output controller 1634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1602 for generation and processing of the baseband signals and for controlling operations of the main memory 1604, the storage device 1616, and/or the fixed-to-fixed shaping encoding device 1619. The baseband processor may be provided on a single radio card, a single chip, or an integrated circuit (IC).

The storage device 1616 may include a machine readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within the static memory 1606, or within the hardware processor 1602 during execution thereof by the machine 1600. In an example, one or any combination of the hardware processor 1602, the main memory 1604, the static memory 1606, or the storage device 1616 may constitute machine-readable media.

The fixed-to-fixed shaping encoding device 1619 may carry out or perform any of the operations and processes (e.g., process 1400) described and shown above.

It is understood that the above are only a subset of what the fixed-to-fixed shaping encoding device 1619 may be configured to perform and that other functions included throughout this disclosure may also be performed by the fixed-to-fixed shaping encoding device 1619.

While the machine-readable medium 1622 is illustrated as a single medium, the term "machine-readable medium" may include a single medium or multiple media (e.g., a centralized or distributed database, and/or associated caches and servers) configured to store the one or more instructions 1624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1600 and that cause the machine 1600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device/transceiver 1620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1620 may include one or more physical jacks (e.g., Ethernet, coaxial, or phone jacks) or one or more antennas to connect to the communications network 1626. In an example, the network interface device/transceiver 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 17:
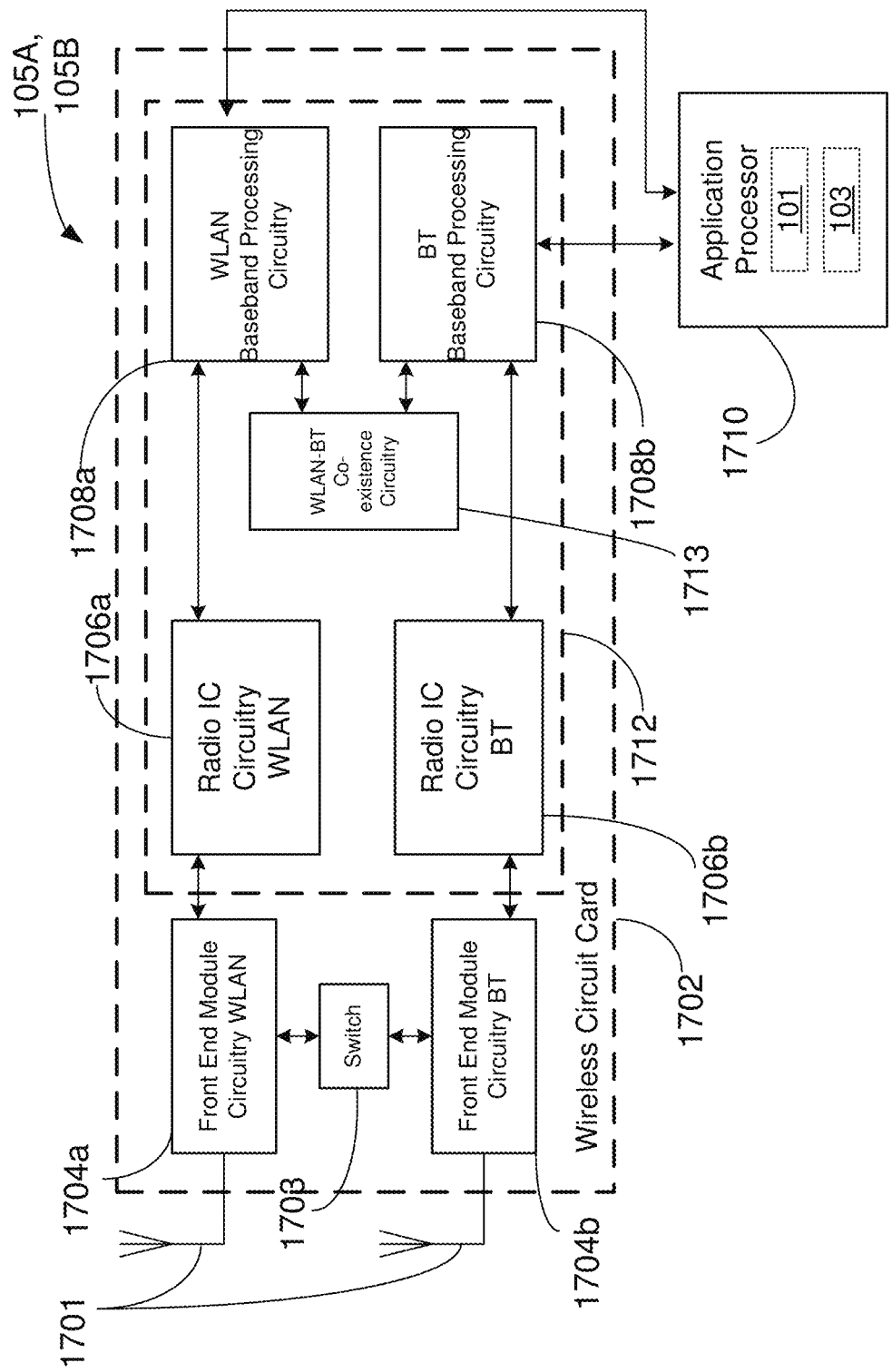
FIG. 17 is a block diagram of a radio architecture in accordance with some examples.

FIG. 17 is a block diagram of a radio architecture 105A, 105B in accordance with some embodiments that may be implemented in any one of the example APs 102 and/or the example STAs 120 of FIG. 1. Radio architecture 105A, 105B may include radio front-end module (FEM) circuitry 1704a-b, radio IC circuitry 1706a-b and baseband processing circuitry 1708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1704a-b may include a WLAN or Wi-Fi FEM circuitry 1704a and a Bluetooth (BT) FEM circuitry 1704b. The WLAN FEM circuitry 1704a may include a receive signal path comprising circuitry configured to operate on WLAN RF signals received from one or more antennas 1701, to amplify the received signals and to provide the amplified versions of the received signals to the WLAN radio IC circuitry 1706a for further processing. The BT FEM circuitry 1704b may include a receive signal path which may include circuitry configured to operate on BT RF signals received from one or more antennas 1701, to amplify the received signals and to provide the amplified versions of the received signals to the BT radio IC circuitry 1706b for further processing. FEM circuitry 1704a may also include a transmit signal path which may include circuitry configured to amplify WLAN signals provided by the radio IC circuitry 1706a for wireless transmission by one or more of the antennas 1701. In addition, FEM circuitry 1704b may also include a transmit signal path which may include circuitry configured to amplify BT signals provided by the radio IC circuitry 1706b for wireless transmission by the one or more antennas. In the embodiment of FIG. 17, although FEM 1704a and FEM 1704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1706a-b as shown may include WLAN radio IC circuitry 1706a and BT radio IC circuitry 1706b. The WLAN radio IC circuitry 1706a may include a receive signal path which may include circuitry to down-convert WLAN RF signals received from the FEM circuitry 1704a and provide baseband signals to WLAN baseband processing circuitry 1708a. BT radio IC circuitry 1706b may in turn include a receive signal path which may include circuitry to down-convert BT RF signals received from the FEM circuitry 1704b and provide baseband signals to BT baseband processing circuitry 1708b. WLAN radio IC circuitry 1706a may also include a transmit signal path which may include circuitry to up-convert WLAN baseband signals provided by the WLAN baseband processing circuitry 1708a and provide WLAN RF output signals to the FEM circuitry 1704a for subsequent wireless transmission by the one or more antennas 1701. BT radio IC circuitry 1706b may also include a transmit signal path which may include circuitry to up-convert BT baseband signals provided by the BT baseband processing circuitry 1708b and provide BT RF output signals to the FEM circuitry 1704b for subsequent wireless transmission by the one or more antennas 1701. In the embodiment of FIG. 17, although radio IC circuitries 1706a and 1706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1708a-b may include a WLAN baseband processing circuitry 1708a and a BT baseband processing circuitry 1708b. The WLAN baseband processing circuitry 1708a may include a memory, such as, for example, a set of RAM arrays in a Fast Fourier Transform or Inverse Fast Fourier Transform block (not shown) of the WLAN baseband processing circuitry 1708a. Each of the WLAN baseband circuitry 1708a and the BT baseband circuitry 1708b may further include one or more processors and control logic to process the signals received from the corresponding WLAN or BT receive signal path of the radio IC circuitry 1706a-b, and to also generate corresponding WLAN or BT baseband signals for the transmit signal path of the radio IC circuitry 1706a-b. Each of the baseband processing circuitries 1708a and 1708b may further include physical layer (PHY) and medium access control layer (MAC) circuitry, and may further interface with a device for generation and processing of the baseband signals and for controlling operations of the radio IC circuitry 1706a-b.

Referring still to FIG. 17, according to the shown embodiment, WLAN-BT coexistence circuitry 1713 may include logic providing an interface between the WLAN baseband circuitry 1708a and the BT baseband circuitry 1708b to enable use cases requiring WLAN and BT coexistence. In addition, a switch 1703 may be provided between the WLAN FEM circuitry 1704a and the BT FEM circuitry 1704b to allow switching between the WLAN and BT radios according to application needs. In addition, although the antennas 1701 are depicted as being respectively connected to the WLAN FEM circuitry 1704a and the BT FEM circuitry 1704b, embodiments include within their scope the sharing of one or more antennas as between the WLAN and BT FEMs, or the provision of more than one antenna connected to each of FEM 1704a or 1704b.

In some embodiments, the front-end module circuitry 1704a-b, the radio IC circuitry 1706a-b, and baseband processing circuitry 1708a-b may be provided on a single radio card, such as wireless radio card 1702. In some other embodiments, the one or more antennas 1701, the FEM circuitry 1704a-b and the radio IC circuitry 1706a-b may be provided on a single radio card. In some other embodiments, the radio IC circuitry 1706a-b and the baseband processing circuitry 1708a-b may be provided on a single chip or integrated circuit (IC), such as IC 1712.

In some embodiments, the wireless radio card 1702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5 GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 18:
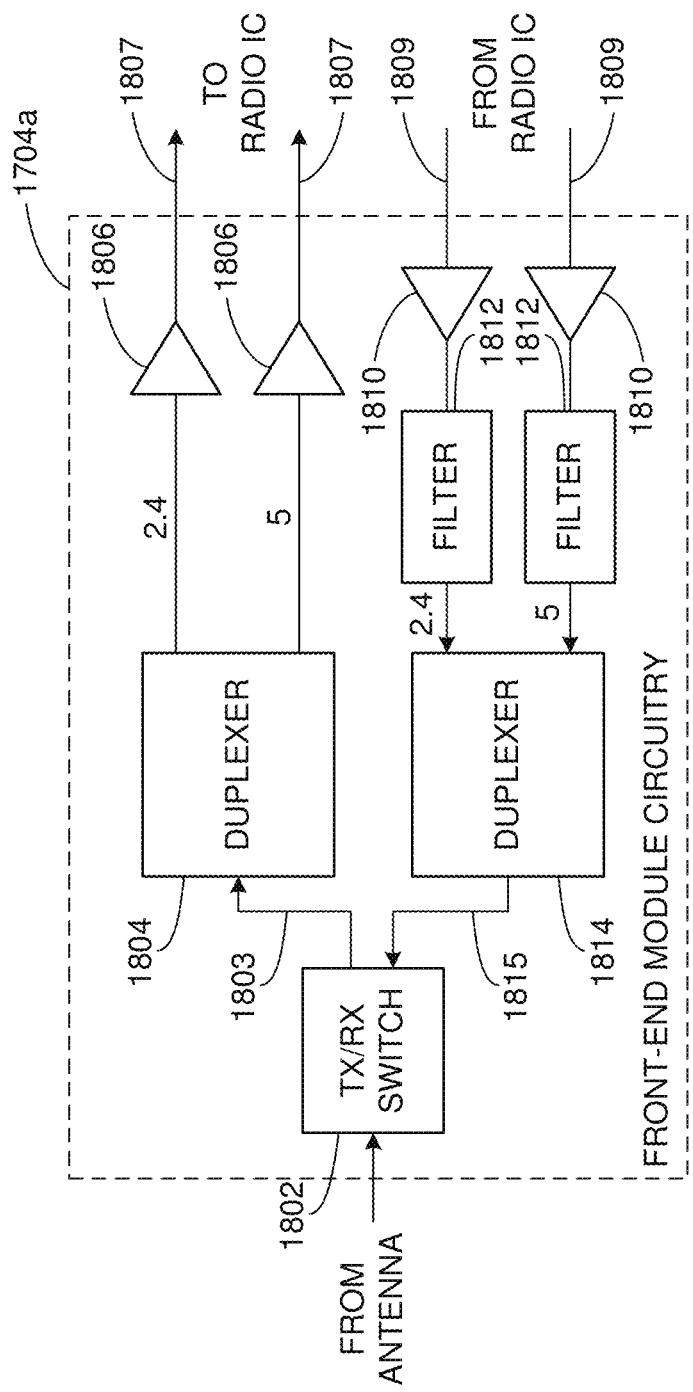
FIG. 18 illustrates an example front-end module circuitry for use in the radio architecture of FIG. 17, in accordance with one or more example embodiments of the present disclosure.

FIG. 18 illustrates WLAN FEM circuitry 1704a in accordance with some embodiments. Although the example of FIG. 18 is described in conjunction with the WLAN FEM circuitry 1704a, the example of FIG. 18 may be described in conjunction with the example BT FEM circuitry 1704b (FIG. 17), although other circuitry configurations may also be suitable.

In some embodiments, the FEM circuitry 1704a may include a TX/RX switch 1802 to switch between transmit mode and receive mode operation. The FEM circuitry 1704a may include a receive signal path and a transmit signal path. The receive signal path of the FEM circuitry 1704a may include a low-noise amplifier (LNA) 1806 to amplify received RF signals 1803 and provide the amplified received RF signals 1807 as an output (e.g., to the radio IC circuitry 1706a-b (FIG. 17)). The transmit signal path of the circuitry 1704a may include a power amplifier (PA) to amplify input RF signals 1809 (e.g., provided by the radio IC circuitry 1706a-b), and one or more filters 1812, such as band-pass filters (BPFs), low-pass filters (LPFs) or other types of filters, to generate RF signals 1815 for subsequent transmission (e.g., by one or more of the antennas 1701 (FIG. 17)) via an example duplexer 1814.

In some dual-mode embodiments for Wi-Fi communication, the FEM circuitry 1704a may be configured to operate in either the 2.4 GHz frequency spectrum or the 5 GHz frequency spectrum. In these embodiments, the receive signal path of the FEM circuitry 1704a may include a receive signal path duplexer 1804 to separate the signals from each spectrum as well as provide a separate LNA 1806 for each spectrum as shown. In these embodiments, the transmit signal path of the FEM circuitry 1704a may also include a power amplifier 1810 and a filter 1812, such as a BPF, an LPF or another type of filter for each frequency spectrum and a transmit signal path duplexer 1804 to provide the signals of one of the different spectrums onto a single transmit path for subsequent transmission by the one or more of the antennas 1701 (FIG. 17). In some embodiments, BT communications may utilize the 2.4 GHz signal paths and may utilize the same FEM circuitry 1704a as the one used for WLAN communications.

Figure 19:
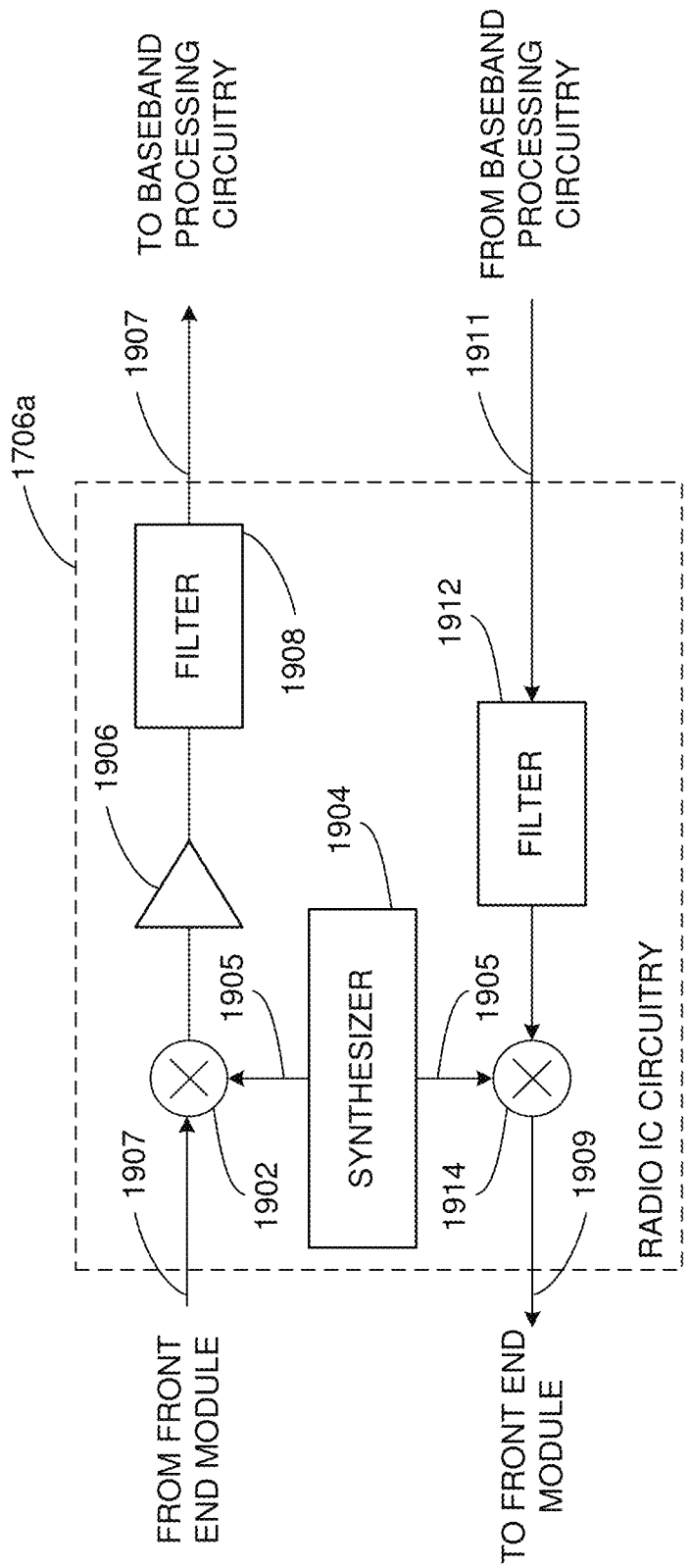
FIG. 19 illustrates an example radio IC circuitry for use in the radio architecture of FIG. 17, in accordance with one or more example embodiments of the present disclosure.

FIG. 19 illustrates radio IC circuitry 1706a in accordance with some embodiments. The radio IC circuitry 1706a is one example of circuitry that may be suitable for use as the WLAN or BT radio IC circuitry 1706a/1706b (FIG. 17), although other circuitry configurations may also be suitable. Alternatively, the example of FIG. 19 may be described in conjunction with the example BT radio IC circuitry 1706b.

In some embodiments, the radio IC circuitry 1706a may include a receive signal path and a transmit signal path. The receive signal path of the radio IC circuitry 1706a may include at least mixer circuitry 1902, such as, for example, down-conversion mixer circuitry, amplifier circuitry 1906 and filter circuitry 1908. The transmit signal path of the radio IC circuitry 1706a may include at least filter circuitry 1912 and mixer circuitry 1914, such as, for example, up-conversion mixer circuitry. Radio IC circuitry 1706a may also include synthesizer circuitry 1904 for synthesizing a frequency 1905 for use by the mixer circuitry 1902 and the mixer circuitry 1914. The mixer circuitry 1902 and/or 1914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 19 illustrates only a simplified version of a radio IC circuitry, and may include, although not shown, embodiments where each of the depicted circuitries may include more than one component. For instance, mixer circuitry 1914 may each include one or more mixers, and filter circuitries 1908 and/or 1912 may each include one or more filters, such as one or more BPFs and/or LPFs according to application needs. For example, when mixer circuitries are of the direct-conversion type, they may each include two or more mixers.

In some embodiments, mixer circuitry 1902 may be configured to down-convert RF signals 1807 received from the FEM circuitry 1704a-b (FIG. 17) based on the synthesized frequency 1905 provided by synthesizer circuitry 1904. The amplifier circuitry 1906 may be configured to amplify the down-converted signals and the filter circuitry 1908 may include an LPF configured to remove unwanted signals from the down-converted signals to generate output baseband signals 1907. Output baseband signals 1907 may be provided to the baseband processing circuitry 1708a-b (FIG. 17) for further processing. In some embodiments, the output baseband signals 1907 may be zero-frequency baseband signals, although this is not a requirement. In some embodiments, mixer circuitry 1902 may comprise passive mixers, although the scope of the embodiments is not limited in this respect.

In some embodiments, the mixer circuitry 1914 may be configured to up-convert input baseband signals 1911 based on the synthesized frequency 1905 provided by the synthesizer circuitry 1904 to generate RF output signals 1809 for the FEM circuitry 1704*a-b*. The baseband signals 1911 may be provided by the baseband processing circuitry 1708*a-b* and may be filtered by filter circuitry 1912. The filter circuitry 1912 may include an LPF or a BPF, although the scope of the embodiments is not limited in this respect.

In some embodiments, the mixer circuitry 1902 and the mixer circuitry 1914 may each include two or more mixers and may be arranged for quadrature down-conversion and/or up-conversion respectively with the help of synthesizer 1904. In some embodiments, the mixer circuitry 1902 and the mixer circuitry 1914 may each include two or more mixers each configured for image rejection (e.g., Hartley image rejection). In some embodiments, the mixer circuitry 1902 and the mixer circuitry 1914 may be arranged for direct down-conversion and/or direct up-conversion, respectively. In some embodiments, the mixer circuitry 1902 and the mixer circuitry 1914 may be configured for super-heterodyne operation, although this is not a requirement.

Mixer circuitry 1902 may comprise, according to one embodiment: quadrature passive mixers (e.g., for the in-phase (I) and quadrature phase (Q) paths). In such an embodiment, RF input signal 1807 from FIG. 19 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1905 of synthesizer 1904 (FIG. 19). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1807 (FIG. 18) may comprise a balanced signal, although the scope of the embodiments is not limited in this respect. The I and Q baseband output signals may be provided to low-noise amplifier, such as amplifier circuitry 1906 (FIG. 19) or to filter circuitry 1908 (FIG. 19).

In some embodiments, the output baseband signals 1907 and the input baseband signals 1911 may be analog baseband signals, although the scope of the embodiments is not limited in this respect. In some alternate embodiments, the output baseband signals 1907 and the input baseband signals 1911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1904 may be a fractional-N synthesizer or a fractional N/N+1 synthesizer, although the scope of the embodiments is not limited in this respect as other types of frequency synthesizers may be suitable. For example, synthesizer circuitry 1904 may be a delta-sigma synthesizer, a frequency multiplier, or a synthesizer comprising a phase-locked loop with a frequency divider. According to some embodiments, the synthesizer circuitry 1904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1904 may be provided by a voltage controlled oscillator (VCO), although that is not a requirement. A divider control input may further be provided by either the baseband processing circuitry 1708*a-b* (FIG. 17) depending on the desired output frequency 1905. In some embodiments, a divider control input (e.g., N) may be determined from a look-up table (e.g., within a Wi-Fi card) based on a channel number and a channel center frequency as determined or indicated by the example application processor 1710. The application processor 1710 may include, or otherwise be connected to, one of the example secure signal converter 101 or the example received signal converter 103 (e.g., depending on which device the example radio architecture is implemented in).

In some embodiments, synthesizer circuitry 1904 may be configured to generate a carrier frequency as the output frequency 1905, while in other embodiments, the output frequency 1905 may be a fraction of the carrier frequency (e.g., one-half the carrier frequency, one-third the carrier frequency). In some embodiments, the output frequency 1905 may be a LO frequency (fLO).

Figure 20:
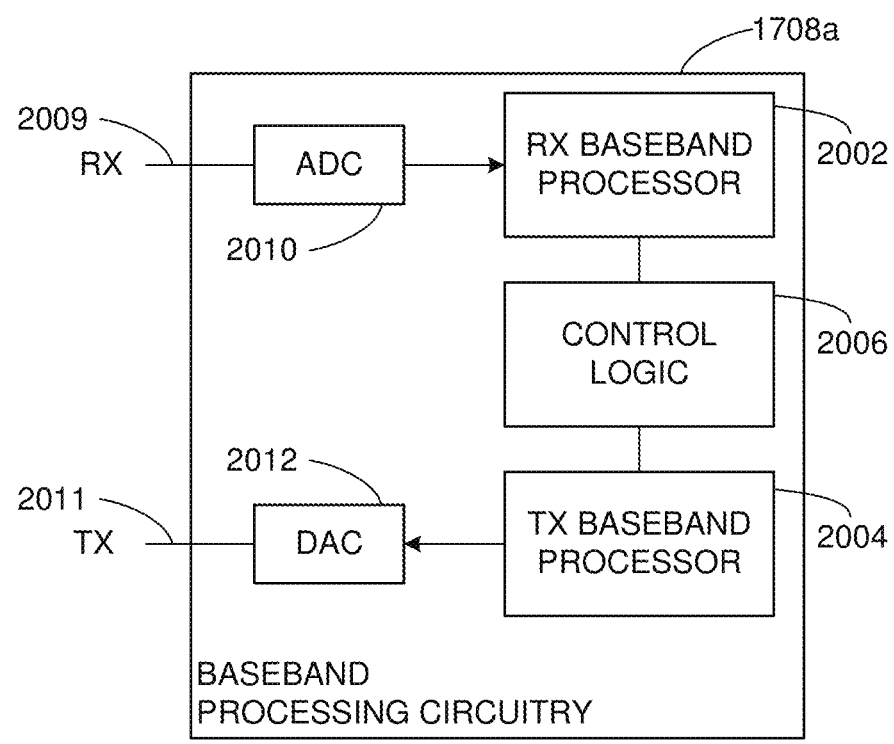
FIG. 20 illustrates an example baseband processing circuitry for use in the radio architecture of FIG. 17, in accordance with one or more example embodiments of the present disclosure.

FIG. 20 illustrates a functional block diagram of baseband processing circuitry 1708*a* in accordance with some embodiments. The baseband processing circuitry 1708*a* is one example of circuitry that may be suitable for use as the baseband processing circuitry 1708*a* (FIG. 17), although other circuitry configurations may also be suitable. Alternatively, the example of FIG. 19 may be used to implement the example BT baseband processing circuitry 1708*b* of FIG. 17.

The baseband processing circuitry 1708*a* may include a receive baseband processor (RX BBP) 2002 for processing receive baseband signals 1909 provided by the radio IC circuitry 1706*a-b* (FIG. 17) and a transmit baseband processor (TX BBP) 2004 for generating transmit baseband signals 1911 for the radio IC circuitry 1706*a-b*. The baseband processing circuitry 1708*a* may also include control logic 2006 for coordinating the operations of the baseband processing circuitry 1708*a*.

In some embodiments (e.g., when analog baseband signals are exchanged between the baseband processing circuitry 1708*a-b* and the radio IC circuitry 1706*a-b*), the baseband processing circuitry 1708*a* may include ADC 2010 to convert analog baseband signals 2009 received from the radio IC circuitry 1706*a-b* to digital baseband signals for processing by the RX BBP 2002. In these embodiments, the baseband processing circuitry 1708a may also include DAC 2012 to convert digital baseband signals from the TX BBP 2004 to analog baseband signals 2011.

In some embodiments that communicate OFDM signals or OFDMA signals, such as through baseband processor 1708a, the transmit baseband processor 2004 may be configured to generate OFDM or OFDMA signals as appropriate for transmission by performing an inverse fast Fourier transform (IFFT). The receive baseband processor 2002 may be configured to process received OFDM signals or OFDMA signals by performing an FFT. In some embodiments, the receive baseband processor 2002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 17, in some embodiments, the antennas 1701 (FIG. 17) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: generate payload bits to be sent to a station device; divide the payload bits into a first plurality of blocks of K bits each, where K may be a positive integer; pass each of the first plurality of blocks of K bits through a shaping encoder, to generate a second plurality of blocks of shaped output bits, wherein the second plurality of blocks of shaped output bits having a variable block size; select a number N of output bits having a fixed size, wherein N may be a positive integer; generate a third plurality of blocks of N bits, wherein each block of the N may be comprised of a block of shaped output bits and a number of overhead bits; generate a physical layer (PHY) protocol data unit (PPDU) comprising the third plurality of blocks of N bits; and causing to transmit, to the station device, the PPDU on the physical layer.

Example 2 may include the device of example 1 and/or some other example herein, wherein the number N of output bits may be based on a probability of overflow associated with an overhead bit percentage of K bits.

Example 3 may include the device of example 2 and/or some other example herein, wherein the processing circuitry may be further configured to determine the number of overhead bits based on requirements for low overflow.

Example 4 may include the device of example 1 and/or some other example herein, wherein the processing circuitry may be further configured to: determine that at least one of the second plurality of blocks of shaped output bits may be larger than the selected number N of output bits; and transmit, to the station device, the PPDU on a physical layer without a last set of bits of a last block of K bits.

Example 5 may include the device of example 1 and/or some other example herein, wherein padding may be applied when at least one of the second plurality of blocks of shaped output bits may be smaller than the selected number N of output bits.

Example 6 may include the device of example 5 and/or some other example herein, wherein the processing circuitry may be further configured to: determine that at least one of the second plurality of blocks of shaped output bits may be smaller than the selected number N of output bits; and add one or more padding bits to the at least one of the second plurality of blocks of shaped output bits.

Example 7 may include the device of example 5 and/or some other example herein, wherein the padding comprises one or more random bits.

Example 8 may include the device of example 5 and/or some other example herein, wherein the padding comprises a repetition of a portion of at least one of the first plurality of blocks of K bits.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver.

Example 11 may include a non-transitory computer-readable medium storing computer-executable instructions which when executed by one or more processors result in performing operations comprising: generating payload bits to be sent to a station device; dividing the payload bits into a first plurality of blocks of K bits each, where K may be a positive integer; passing each of the first plurality of blocks of K bits through a shaping encoder, to generate a second plurality of blocks of shaped output bits, wherein the second plurality of blocks of shaped output bits having a variable block size; selecting a number N of output bits having a fixed size, wherein N may be a positive integer, generating a third plurality of blocks of N bits, wherein each block of the N may be comprised of a block of shaped output bits and a number of overhead bits; generating a physical layer (PHY) protocol data unit (PPDU) comprising the third plurality of blocks of N bits; and causing to transmit, to the station device, the PPDU on the physical layer.

Example 12 may include the non-transitory computer-readable medium of example 11 and/or some other example herein, wherein the number N of output bits may be based on a probability of overflow associated with an overhead bit percentage of K bits.

Example 13 may include the non-transitory computer-readable medium of example 12 and/or some other example herein, wherein the operations further comprise determining the number of overhead bits based on requirements for low overflow.

Example 14 may include the non-transitory computer-readable medium of example 11 and/or some other example herein, wherein the operations further comprise: determining that at least one of the second plurality of blocks of shaped output bits may be larger than the selected number N of output bits; and transmitting, to the station device, the PPDU on a physical layer without a last set of bits of a last block of K bits.

Example 15 may include the non-transitory computer-readable medium of example 11 and/or some other example herein, wherein padding may be applied when at least one of the second plurality of blocks of shaped output bits may be smaller than the selected number N of output bits.

Example 16 may include the non-transitory computer-readable medium of example 15 and/or some other example herein, wherein the operations further comprise: determining that at least one of the second plurality of blocks of shaped output bits may be smaller than the selected number N of output bits; and adding one or more padding bits to the at least one of the second plurality of blocks of shaped output bits.

Example 17 may include the non-transitory computer-readable medium of example 15 and/or some other example herein, wherein the padding comprises one or more random bits.

Example 18 may include the non-transitory computer-readable medium of example 5 and/or some other example herein, wherein the padding comprises a repetition of a portion of at least one of the first plurality of blocks of K bits.

Example 19 may include a method comprising: generating, by one or more processors, payload bits to be sent to a station device; dividing the payload bits into a first plurality of blocks of K bits each, where K may be a positive integer; passing each of the first plurality of blocks of K bits through a shaping encoder, to generate a second plurality of blocks of shaped output bits, wherein the second plurality of blocks of shaped output bits having a variable block size; selecting a number N of output bits having a fixed size, wherein N may be a positive integer, generating a third plurality of blocks of N bits, wherein each block of the N may be comprised of a block of shaped output bits and a number of overhead bits; generating a physical layer (PHY) protocol data unit (PPDU) comprising the third plurality of blocks of N bits; and causing to transmit, to the station device, the PPDU on the physical layer.

Example 20 may include the method of example 19 and/or some other example herein, wherein the number N of output bits may be based on a probability of overflow associated with an overhead bit percentage of K bits.

Example 21 may include the method of example 20 and/or some other example herein, further comprising determining the number of overhead bits based on requirements for low overflow.

Example 22 may include the method of example 19 and/or some other example herein, further comprising: determining that at least one of the second plurality of blocks of shaped output bits may be larger than the selected number N of output bits; and transmitting, to the station device, the PPDU on a physical layer without a last set of bits of a last block of K bits.

Example 23 may include the method of example 19 and/or some other example herein, wherein padding may be applied when at least one of the second plurality of blocks of shaped output bits may be smaller than the selected number N of output bits.

Example 24 may include the method of example 23 and/or some other example herein, further comprising: determining that at least one of the second plurality of blocks of shaped output bits may be smaller than the selected number N of output bits; and adding one or more padding bits to the at least one of the second plurality of blocks of shaped output bits.

Example 25 may include the method of example 23 and/or some other example herein, wherein the padding comprises one or more random bits.

Example 26 may include the method of example 23 and/or some other example herein, wherein the padding comprises a repetition of a portion of at least one of the first plurality of blocks of K bits.

Example 27 may include an apparatus comprising means for: generating payload bits to be sent to a station device; dividing the payload bits into a first plurality of blocks of K bits each, where K may be a positive integer; passing each of the first plurality of blocks of K bits through a shaping encoder, to generate a second plurality of blocks of shaped output bits, wherein the second plurality of blocks of shaped output bits having a variable block size; selecting a number N of output bits having a fixed size, wherein N may be a positive integer, generating a third plurality of blocks of N bits, wherein each block of the N may be comprised of a block of shaped output bits and a number of overhead bits; generating a physical layer (PHY) protocol data unit (PPDU) comprising the third plurality of blocks of N bits; and causing to transmit, to the station device, the PPDU on the physical layer.

Example 28 may include the apparatus of example 27 and/or some other example herein, wherein the number N of output bits may be based on a probability of overflow associated with an overhead bit percentage of K bits.

Example 29 may include the apparatus of example 28 and/or some other example herein, further comprising determining the number of overhead bits based on requirements for low overflow.

Example 30 may include the apparatus of example 27 and/or some other example herein, further comprising: determining that at least one of the second plurality of blocks of shaped output bits may be larger than the selected number N of output bits; and transmitting, to the station device, the PPDU on a physical layer without a last set of bits of a last block of K bits.

Example 31 may include the apparatus of example 27 and/or some other example herein, wherein padding may be applied when at least one of the second plurality of blocks of shaped output bits may be smaller than the selected number N of output bits.

Example 32 may include the apparatus of example 31 and/or some other example herein, further comprising: determining that at least one of the second plurality of blocks of shaped output bits may be smaller than the selected number N of output bits; and adding one or more padding bits to the at least one of the second plurality of blocks of shaped output bits.

Example 33 may include the apparatus of example 31 and/or some other example herein, wherein the padding comprises one or more random bits.

Example 34 may include the apparatus of example 31 and/or some other example herein, wherein the padding comprises a repetition of a portion of at least one of the first plurality of blocks of K bits.

Example 35 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 36 may include an apparatus comprising logic, modules, and/or circuitry to perform one or more elements of a method described in or related to any of examples 1-21, or any other method or process described herein.

Example 37 may include a method, technique, or process as described in or related to any of examples 1-21, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 39 may include a method of communicating in a wireless network as shown and described herein.

Example 40 may include a system for providing wireless communication as shown and described herein.

Example 41 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   generate payload bits to be sent to a station device;
   divide the payload bits into a first plurality of blocks of K bits each, where K is a positive integer;
   pass each of the first plurality of blocks of K bits through a shaping encoder, to generate a second plurality of blocks of shaped output bits, wherein the second plurality of blocks of shaped output bits having a variable block size;
   select a number N of output bits having a fixed size, wherein N is a positive integer,
   generate a third plurality of blocks of N bits, wherein each block of the N is comprised of a block of shaped output bits and a number of overhead bits;
   generate a physical layer (PHY) protocol data unit (PPDU) comprising the third plurality of blocks of N bits; and
   cause to transmit, to the station device, the PPDU on the physical layer.

2. The device of claim 1, wherein the number N of output bits is based on a probability of overflow associated with an overhead bit percentage of K bits.

3. The device of claim 2, wherein the processing circuitry is further configured to determine the number of overhead bits based on requirements for low overflow.

4. The device of claim 1, wherein the processing circuitry is further configured to:
   determine that at least one of the second plurality of blocks of shaped output bits is larger than the selected number N of output bits; and
   transmit, to the station device, the PPDU on a physical layer without a last set of bits of a last block of K bits.

5. The device of claim 1, wherein padding is applied when at least one of the second plurality of blocks of shaped output bits is smaller than the selected number N of output bits.

6. The device of claim 5, wherein the processing circuitry is further configured to:

determine that at least one of the second plurality of blocks of shaped output bits is smaller than the selected number N of output bits; and add one or more padding bits to the at least one of the second plurality of blocks of shaped output bits.

7. The device of claim 5, wherein the padding comprises one or more random bits.

8. The device of claim 5, wherein the padding comprises a repetition of a portion of at least one of the first plurality of blocks of K bits.

9. The device of claim 1, further comprising a transceiver configured to transmit and receive wireless signals.

10. The device of claim 9, further comprising an antenna coupled to the transceiver.

11. A non-transitory computer-readable medium storing computer-executable instructions which when executed by one or more processors result in performing operations comprising:

generating payload bits to be sent to a station device;

dividing the payload bits into a first plurality of blocks of K bits each, where K is a positive integer;

passing each of the first plurality of blocks of K bits through a shaping encoder, to generate a second plurality of blocks of shaped output bits, wherein the second plurality of blocks of shaped output bits having a variable block size;

selecting a number N of output bits having a fixed size, wherein N is a positive integer, generating a third plurality of blocks of N bits, wherein each block of the N is comprised of a block of shaped output bits and a number of overhead bits;

generating a physical layer (PHY) protocol data unit (PPDU) comprising the third plurality of blocks of N bits; and causing to transmit, to the station device, the PPDU on the physical layer.

12. The non-transitory computer-readable medium of claim 11, wherein the number N of output bits is based on a probability of overflow associated with an overhead bit percentage of K bits.

13. The non-transitory computer-readable medium of claim 12, wherein the operations further comprise determining the number of overhead bits based on requirements for low overflow.

14. The non-transitory computer-readable medium of claim 11, wherein the operations further comprise:

determining that at least one of the second plurality of blocks of shaped output bits is larger than the selected number N of output bits; and transmitting, to the station device, the PPDU on a physical layer without a last set of bits of a last block of K bits.

15. The non-transitory computer-readable medium of claim 11, wherein padding is applied when at least one of the second plurality of blocks of shaped output bits is smaller than the selected number N of output bits.

16. The non-transitory computer-readable medium of claim 15, wherein the operations further comprise:

determining that at least one of the second plurality of blocks of shaped output bits is smaller than the selected number N of output bits; and adding one or more padding bits to the at least one of the second plurality of blocks of shaped output bits.

17. The non-transitory computer-readable medium of claim 15, wherein the padding comprises one or more random bits.

18. The non-transitory computer-readable medium of claim 15, wherein the padding comprises a repetition of a portion of at least one of the first plurality of blocks of K bits.

19. A method comprising:

generating, by one or more processors, payload bits to be sent to a station device;

dividing the payload bits into a first plurality of blocks of K bits each, where K is a positive integer;

passing each of the first plurality of blocks of K bits through a shaping encoder, to generate a second plurality of blocks of shaped output bits, wherein the second plurality of blocks of shaped output bits having a variable block size;

selecting a number N of output bits having a fixed size, wherein N is a positive integer, generating a third plurality of blocks of N bits, wherein each block of the N is comprised of a block of shaped output bits and a number of overhead bits;

generating a physical layer (PHY) protocol data unit (PPDU) comprising the third plurality of blocks of N bits; and causing to transmit, to the station device, the PPDU on the physical layer.

20. The method of claim 19, wherein the number N of output bits is based on a probability of overflow associated with an overhead bit percentage of K bits.

* * * * *